United States Patent
Orttung et al.

(10) Patent No.: US 8,090,707 B1
(45) Date of Patent: Jan. 3, 2012

(54) CHANCE MEETING ADDITION TO TRIP PLANNER OR MEETING PLANNER

(75) Inventors: Mark Orttung, Menlo Park, CA (US); Gabriel Sandoval, Los Gatos, CA (US)

(73) Assignee: Rearden Commerce Inc., San Mateo, CA (US)

( * ) Notice: Subject to any disclaimer, the term of this patent is extended or adjusted under 35 U.S.C. 154(b) by 0 days.

(21) Appl. No.: 11/177,793

(22) Filed: Jul. 7, 2005

(51) Int. Cl.
*G06F 7/00* (2006.01)

(52) U.S. Cl. ............ 707/710; 707/944; 707/951; 705/6; 705/319

(58) Field of Classification Search .................. 705/5, 6, 705/8; 715/751, 963
See application file for complete search history.

(56) References Cited

U.S. PATENT DOCUMENTS

| | | | |
|---|---|---|---|
| 4,445,181 A | 4/1984 | Yatman | |
| 4,626,836 A | 12/1986 | Curtis et al. | |
| 4,862,357 A | 8/1989 | Ahlstrom et al. | |
| 4,977,520 A | 12/1990 | McGaughey et al. | |
| 5,111,391 A | 5/1992 | Fields et al. | |
| 5,323,314 A | 6/1994 | Baber et al. | |
| 5,475,740 A | 12/1995 | Biggs et al. | |
| 5,570,283 A | 10/1996 | Shoolery et al. | |
| 5,655,008 A | 8/1997 | Futch et al. | |
| 5,692,125 A | 11/1997 | Schloss et al. | |
| 5,732,401 A | 3/1998 | Conway | |
| 5,832,451 A | 11/1998 | Flake et al. | |
| 5,852,812 A | 12/1998 | Reeder | |
| 5,854,835 A | 12/1998 | Montgomery et al. | |
| 5,893,077 A | 4/1999 | Griffin | |
| 5,897,620 A | 4/1999 | Walker et al. | |
| 5,933,810 A | 8/1999 | Okawa | |
| 5,960,069 A | 9/1999 | Felger | |
| 5,960,406 A | 9/1999 | Rasansky et al. | |
| 5,963,913 A | 10/1999 | Henneuse et al. | |
| 5,966,386 A | 10/1999 | Maegawa | |
| 5,974,391 A | 10/1999 | Hongawa | |
| 6,016,478 A | 1/2000 | Zhang et al. | |
| 6,078,907 A | 6/2000 | Lamm | |
| 6,101,480 A | 8/2000 | Conmy et al. | |
| 6,167,379 A | 12/2000 | Dean et al. | |
| 6,195,420 B1 | 2/2001 | Tognazzini | |
| 6,220,512 B1 | 4/2001 | Cooper | |
| 6,230,204 B1 | 5/2001 | Fleming | |

(Continued)

OTHER PUBLICATIONS

General Services Administration, "Integrated, Automated Information System (IAIS)," Request for Information, provided by Federal Information & News Dispatch, Inc., FedBizOpps, Jan. 30, 2003.

(Continued)

*Primary Examiner* — Vei-Chung Liang
(74) *Attorney, Agent, or Firm* — Greenberg Traurig, LLP

(57) ABSTRACT

One embodiment of the present invention includes a system and method for managing a travel plan. In response to a travel plan being identified for a traveler, a search is performed for one or more persons based on a predetermined relation to the traveler. In response to identifying one or more persons based on the predetermined relation to the traveler, it is determined if the one or more such persons is to be present at a location in proximity to the traveler's location according to the travel plan. If the one or more such persons is to be present at a location in proximity to the traveler's location, an opportunity is presented to modify the travel plan to accommodate those persons.

11 Claims, 16 Drawing Sheets

U.S. PATENT DOCUMENTS

| Patent | Date | Inventor | Ref |
|---|---|---|---|
| 6,295,521 B1 | 9/2001 | DeMarcken et al. | |
| 6,304,850 B1 | 10/2001 | Keller et al. | |
| 6,307,572 B1 | 10/2001 | DeMarcken et al. | |
| 6,324,517 B1 | 11/2001 | Bingham et al. | |
| 6,441,836 B1 | 8/2002 | Takasu et al. | |
| 6,442,526 B1 | 8/2002 | Vance et al. | |
| 6,477,520 B1 | 11/2002 | Malaviya et al. | |
| 6,506,056 B1 | 1/2003 | DeMedio | |
| 6,529,597 B1 | 3/2003 | Barrett | |
| 6,603,489 B1 | 8/2003 | Edlund et al. | |
| 6,732,103 B1 | 5/2004 | Strick et al. | |
| 6,781,920 B2 | 8/2004 | Bates et al. | |
| 6,816,882 B1 | 11/2004 | Conner et al. | |
| 6,847,988 B2 | 1/2005 | Toyouchi et al. | |
| 6,889,205 B1 | 5/2005 | Lamm | |
| 6,961,773 B2 | 11/2005 | Hartman et al. | |
| 6,993,430 B1 | 1/2006 | Bellesfield et al. | |
| 7,007,080 B2 | 2/2006 | Wilson | |
| 7,013,127 B2 | 3/2006 | Wills et al. | |
| 7,027,995 B2 | 4/2006 | Kaufman et al. | |
| 7,050,986 B1 | 5/2006 | Vance et al. | |
| 7,054,825 B1 | 5/2006 | Hirahara et al. | |
| 7,080,019 B1 | 7/2006 | Hurzeier | |
| 7,092,892 B1 | 8/2006 | Sobalvarro et al. | |
| 7,139,728 B2 | 11/2006 | Rigole | |
| 7,149,700 B1 | 12/2006 | Munoz et al. | |
| 7,207,009 B1 | 4/2007 | Aamodt et al. | |
| 7,212,983 B2 | 5/2007 | Redmann et al. | |
| 7,222,084 B2 | 5/2007 | Archibald et al. | |
| 7,233,971 B1 | 6/2007 | Levy | |
| 7,236,976 B2 | 6/2007 | Breitenbach et al. | |
| 7,277,888 B2 | 10/2007 | Gelormine et al. | |
| 7,283,970 B2 | 10/2007 | Cragun et al. | |
| 7,340,402 B1 | 3/2008 | DeMarcken et al. | |
| 7,343,312 B2 | 3/2008 | Capek et al. | |
| 7,360,164 B2 | 4/2008 | Bjoernsen et al. | |
| 7,383,291 B2 | 6/2008 | Guiheneuf et al. | |
| 7,389,351 B2 | 6/2008 | Horvitz | |
| 7,409,643 B2 | 8/2008 | Daughtrey | |
| 7,418,409 B1 | 8/2008 | Goel | |
| 7,451,392 B1 | 11/2008 | Chalecki et al. | |
| 7,471,209 B2 | 12/2008 | Hartman et al. | |
| 7,487,211 B2 | 2/2009 | Beavers et al. | |
| 7,603,285 B2 | 10/2009 | Jacobs et al. | |
| 7,640,548 B1 | 12/2009 | Yu et al. | |
| 7,668,536 B2 | 2/2010 | Hull et al. | |
| 2001/0014867 A1 | 8/2001 | Conmy | |
| 2002/0022923 A1 | 2/2002 | Hirabayashi | |
| 2002/0022981 A1 | 2/2002 | Goldstein et al. | |
| 2002/0023230 A1* | 2/2002 | Bolnick et al. | 713/202 |
| 2002/0026336 A1 | 2/2002 | Eizenburg et al. | |
| 2002/0032589 A1* | 3/2002 | Shah | 705/6 |
| 2002/0032592 A1 | 3/2002 | Krasnick et al. | |
| 2002/0038180 A1 | 3/2002 | Bellesfield et al. | |
| 2002/0046076 A1 | 4/2002 | Baillargeon et al. | |
| 2002/0065689 A1 | 5/2002 | Bingham et al. | |
| 2002/0069093 A1 | 6/2002 | Stanfield | |
| 2002/0069094 A1 | 6/2002 | Bingham et al. | |
| 2002/0091556 A1* | 7/2002 | Fiala et al. | 705/6 |
| 2002/0111845 A1 | 8/2002 | Chong | |
| 2002/0131565 A1 | 9/2002 | Scheuring et al. | |
| 2002/0154178 A1 | 10/2002 | Barnett et al. | |
| 2002/0156661 A1* | 10/2002 | Jones et al. | 705/6 |
| 2003/0004746 A1 | 1/2003 | Kheirolomoom et al. | |
| 2003/0004762 A1 | 1/2003 | Banerjee et al. | |
| 2003/0018551 A1 | 1/2003 | Hanson et al. | |
| 2003/0033164 A1 | 2/2003 | Faltings et al. | |
| 2003/0036929 A1 | 2/2003 | Vaughan et al. | |
| 2003/0040946 A1 | 2/2003 | Sprenger et al. | |
| 2003/0050806 A1 | 3/2003 | Friesen et al. | |
| 2003/0055689 A1 | 3/2003 | Block et al. | |
| 2003/0110062 A1 | 6/2003 | Mogler et al. | |
| 2003/0110063 A1 | 6/2003 | Among et al. | |
| 2003/0149606 A1 | 8/2003 | Cragun et al. | |
| 2004/0003042 A1 | 1/2004 | Horvitz et al. | |
| 2004/0027379 A1 | 2/2004 | Hong et al. | |
| 2004/0039617 A1 | 2/2004 | Maycotte et al. | |
| 2004/0044556 A1 | 3/2004 | Brady et al. | |
| 2004/0073615 A1 | 4/2004 | Darling | |
| 2004/0078257 A1 | 4/2004 | Schweitzer et al. | |
| 2004/0093263 A1 | 5/2004 | Doraisamy et al. | |
| 2004/0093290 A1 | 5/2004 | Doss et al. | |
| 2004/0116115 A1 | 6/2004 | Ertel | |
| 2004/0122721 A1 | 6/2004 | Lasora | |
| 2004/0148207 A1 | 7/2004 | Smith et al. | |
| 2004/0153348 A1 | 8/2004 | Garback | |
| 2004/0193457 A1 | 9/2004 | Shogren | |
| 2004/0199423 A1 | 10/2004 | LaBrosse et al. | |
| 2005/0033614 A1* | 2/2005 | Lettovsky et al. | 705/5 |
| 2005/0033615 A1 | 2/2005 | Nguyen et al. | |
| 2005/0033616 A1 | 2/2005 | Vavul et al. | |
| 2005/0066304 A1 | 3/2005 | Tattrie et al. | |
| 2005/0119927 A1 | 6/2005 | Patel | |
| 2005/0125408 A1* | 6/2005 | Somaroo et al. | 707/10 |
| 2005/0209914 A1 | 9/2005 | Nguyen et al. | |
| 2005/0228677 A1 | 10/2005 | McCabe et al. | |
| 2005/0233743 A1 | 10/2005 | Karaguz et al. | |
| 2006/0004590 A1* | 1/2006 | Khoo | 705/1 |
| 2006/0004613 A1 | 1/2006 | Roller et al. | |
| 2006/0010023 A1 | 1/2006 | Tromczynski et al. | |
| 2006/0059024 A1 | 3/2006 | Bailey et al. | |
| 2006/0095377 A1* | 5/2006 | Young et al. | 705/50 |
| 2006/0106655 A1 | 5/2006 | Lettovsky et al. | |
| 2006/0224969 A1 | 10/2006 | Marston | |
| 2006/0277079 A1 | 12/2006 | Gilligan et al. | |
| 2007/0150075 A1 | 6/2007 | Dumas et al. | |
| 2007/0185744 A1 | 8/2007 | Robertson | |
| 2008/0052217 A1 | 2/2008 | Etkin | |
| 2008/0126143 A1 | 5/2008 | Altman et al. | |
| 2008/0141158 A1 | 6/2008 | Daughtrey | |
| 2008/0228547 A1 | 9/2008 | Doss et al. | |

OTHER PUBLICATIONS

Business Editors/High-Tech Writers, "Talaris and GetThere Provide Enterprises with New Set of Online Business Services," Business Wire, New York, p. 1, Oct. 15, 2001.

Business Editors/High-Tech Writers, "GetThere to Integrate and Resell Talaris' Web Services Offering to Complement Leading Corporate Online Travel Reservation System," Business Wire, San Francisco, p. 1, Oct. 15, 2001.

Albright, Peggy, "Companies Send Strong Message About Saving Money," Wireless Week, vol. 7, Issue 29, p. 24, Jul. 16, 2001.

Orttung, Mark et al., U.S. Appl. No. 11/026,798, entitled "Intelligent Meeting Planner," filed Dec. 30, 2004.

Patwardhan, Shantanu et al., U.S. Appl. No. 11/121,863, entitled "Method and System for Automatic Scheduling of Multiple Subgroup Meetings," filed May 3, 2005.

Shah, Purvi et al., U.S. Appl. No. 11/177,997, entitled "Method and System for Enhanced Visual Meeting and Schedule Planner," filed Jul. 7, 2005.

Hopkinson, Natalie, "Online invitations transform party life," Journal Gazette, final edition, Washington Post, Dec. 31, 2002.

* cited by examiner

Airlines, Sun Nov 21. Microsoft Internet Explorer
Tools  Help

Search  Favorites  Media  [icons] — 500

Settings\northung\Mark's Data\Products\OldDocs\Travelprototypes\Email Demov3\Small Grapemailv1.htm

— 501

TALARIS
Group Member Itinerary Booked For
Forrester Research Meeting
November 24, 2002
9AM - 2PM (EST)
24 Forrester Place
Waltham, MA 02123

502

Patrick Grady Has booked his itinerary for the Forrester Research Meeting. Please use the buttons at the end of the email to book a similar itinerary.

San Francisco (SFO) to Boston (BOS)
Flights: American Airlines #194
Departure: Sunday, November 23 at 2:05 PM
Arrival: Sunday, November 23 at 10:31 PM
Seating: Economy Class, 20F Boston (BOS) to San Francisco (SFO)
Flights: American Airlines #197
Departure: Monday, November 24 at 8:10 PM
Arrival: Sunday, November 24 at 8:37 PM
Seating: Economy Class, 10C

503

Hotel: LE MERIDIEN BOSTON
      250 Franklin St, Boston, MA 02110
      1 517 451 1900 View Map
Check-in: Sunday, November 23
Check-out: Monday, November 24

Car: Hertz
     On Airport (BOS)
Class: Compact
Pick-up: Sunday, November 23
511 — Drop-off: Monday, November 24 — 512    — 513

Book Identical Itinerary | Book Air and Hotel, Share Car | Meet at Airport, Share car
Meet at Hotel ⌐514
510

Thank for using Talaris. Have a great meeting.

FIG. 5

CHANCE MEETING ADDITION TO TRIP PLANNER OR MEETING PLANNER

FIELD OF THE INVENTION

This invention relates generally to procurement of services, and more particularly to coordinating the group procurement of services.

BACKGROUND OF THE INVENTION

Often trips, particularly business trips, must be planned far in advance of the departure date. In some cases, it may happen that at the time of the trip, people that a traveler wants to meet with may be in the same area as the traveler. However, because no meeting has been scheduled to occur during the trip, a traveler may be unaware of the proximity of the people that he or she potentially wants to meet.

What is clearly needed is a system and method for a chance meeting planner that helps arrange meetings with people that a traveler may be interested in meeting but whose travel plans he was not aware of when the trip was planned, so he did not schedule a meeting with them during his trip.

SUMMARY OF THE INVENTION

One embodiment of the present invention includes a system and method for a chance meeting planner that helps arrange meetings with people that a traveler may be interested in meeting but whose travel plans he was not aware of when the trip was planned, so he did not schedule a meeting with them during his trip.

BRIEF DESCRIPTION OF THE DRAWINGS

FIG. 5 illustrates screen shot as it would be seen by a group member, in accordance with one embodiment of an automated services exchange.

DETAILED DESCRIPTION

In the following detailed description of embodiments of the invention, reference is made to the accompanying drawings in which like references indicate similar elements, and in which is shown by way of illustration specific embodiments in which the invention may be practiced. These embodiments are described in sufficient detail to enable those skilled in the art to practice the invention, and it is to be understood that other embodiments may be utilized and that logical, mechanical, electrical, functional, and other changes may be made without departing from the scope of the present invention. The following detailed description is, therefore, not to be taken in a limiting sense, and the scope of the present invention is defined only by the appended claims.

Figure 1:
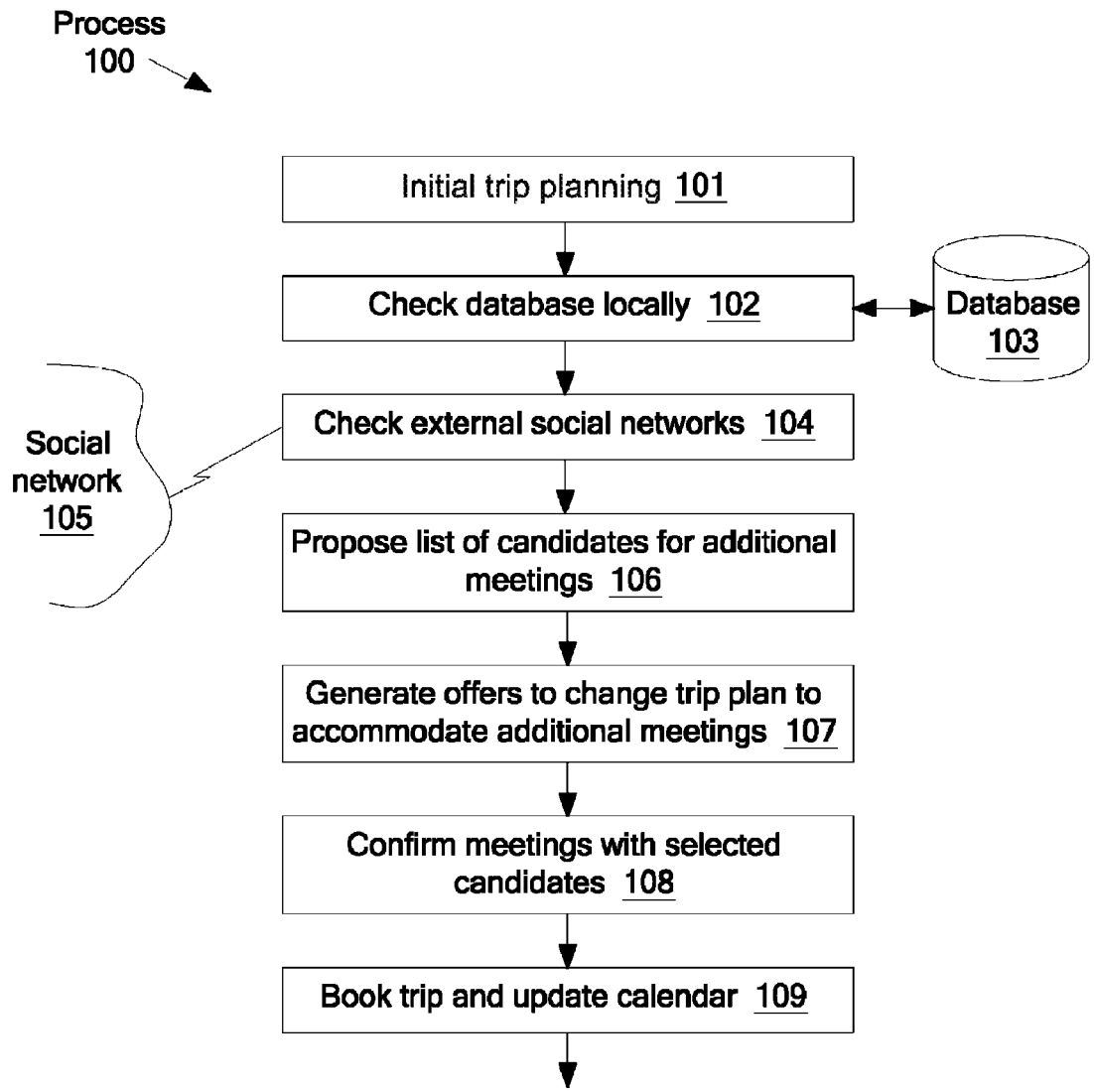
FIG. 1 shows an example flow diagram of the process of a chance meeting planner, in accordance with one embodiment.

FIG. 1 shows an example flow diagram 100 of the process of a chance meeting planner. Said chance planer would be running together with other meeting planners, travel planners, and other modules that are part of the REARDEN COMMERCE™ services procurement platform one embodiment of which is described in detail below in paragraphs [022]-[080]. After the initial trip planning process in step 101, a check in step 102 would be made of internal database 103, which contains contact data about people of interest to the traveler. Database 103 may be a part of the main local database or it may be obtained from enterprise contact management tools or other sources of contact data. Additionally, a check at step 104 may invoke external social network software, as is well known in the art, which software may be integrated with special drivers, or by harvesting web pages of their interfaces, represented as 105 (typically residing on the Internet). In some cases better integration of social network software into the system may be achieved by having an Application Programming Interface (API) exchange available or by creating an API exchange; in other cases, web harvesting or screen scraping may be used as the alternative to interface to those social network software systems. API exchanges are exchanges of APIs between the social network software developer and the trip planning software developer provide better interface capability between the software programs. For example, the trip planning software may directly request possible candidates for additional meetings using an API of a particular social network. Alternatively, or additionally, web harvesting and screen scraping may be used to extract information from web pages and screen displays of social network information using optical character recognition, text parsing, and other methods used to convert output intended for human viewing to be used for input to the trip planning software. Based on one or both of those methods of access to information about people of interest, i.e., direct interface (for example API, web interface, etc.) or web page scraping, a possible list of candidates for additional meetings is created at step 106. Certain rules that previously may have been given to the system and that could be stored in the main database or as part of the local contacts database may be used to create a selection of perhaps two or three top potential candidates for meetings. It will be apparent to one skilled in the art that various information associated with each candidate may be retrieved from the social network, for example, and that this information may be used to compute, for each candidate, a value such that the candidates with the highest values are the top potential candidates for meetings. Based on those candidates and their availability at the target destination, at step 107 the system may generate one or more offers to change the planned schedule, such as, for example, pushing back the traveler's return time for a few hours or even overnight to allow for an extra meeting. At step 108, a meeting is confirmed with the other party, and then in step 109, the booking is closed.

For example, if Mark is traveling from San Francisco to Chicago and John is traveling from New York to Chicago, they may have the same evening available in Chicago. The system may propose a dinner meeting for them. Or if John is planning to fly back to New York that night, the system may propose, for example, that John take a late night flight (such as a flight at 10 or 11 p.m.), or even stay overnight in Chicago.

Other than using contact databases, the system may look for information about contacts and their travel plans and follow certain rules about "advertisement," meaning that, for example, if Mark and John don't work for the same company, Mark may make his trip "private" so that even if John is on Mark's preferred list, John may not see that Mark is traveling. This feature is important for reasons such as, for example, a case where Mark decided he doesn't want to meet with John. Or in other cases, due to some current "political" situation between the two companies or between the persons, such a meeting may not be desired and the advertisement of the availability of such a meeting could create problems.

Figure 2:
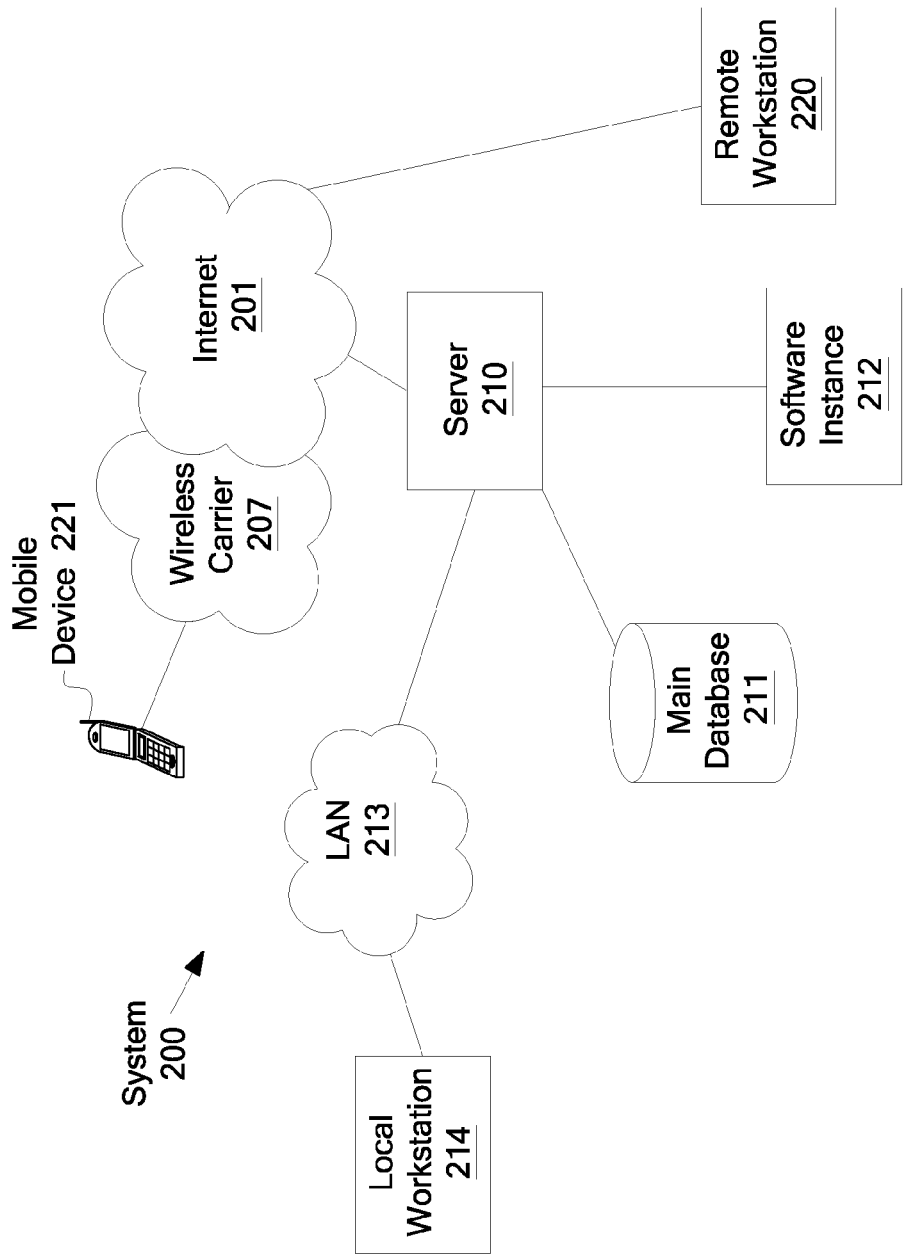
FIG. 2 shows an overview diagram of the architecture of an exemplary system in accordance with one embodiment.

FIG. 2 shows an overview diagram of the architecture of an exemplary system 200 according to the novel art of this disclosure. A server 210 is running an instance 212 of the software and contains a main database 211, which may contain all the other data such as, for example, company travel policies, company internal social networking, etc. Alternatively, database 211 may be a distributed database. Also, server 210 may run other modules of the REARDEN COMMERCE™ services procurement platform. A user may be at a local workstation 214 connected through a LAN 213, or the user may be at a separate, remote workstation 220 connected through the Internet 201, or in yet other cases, the user may be using a mobile device 221 that connects through a wireless carrier 202 to Internet 201, often using VPN-type technology.

Automatic Service Exchange

Figure 1A:
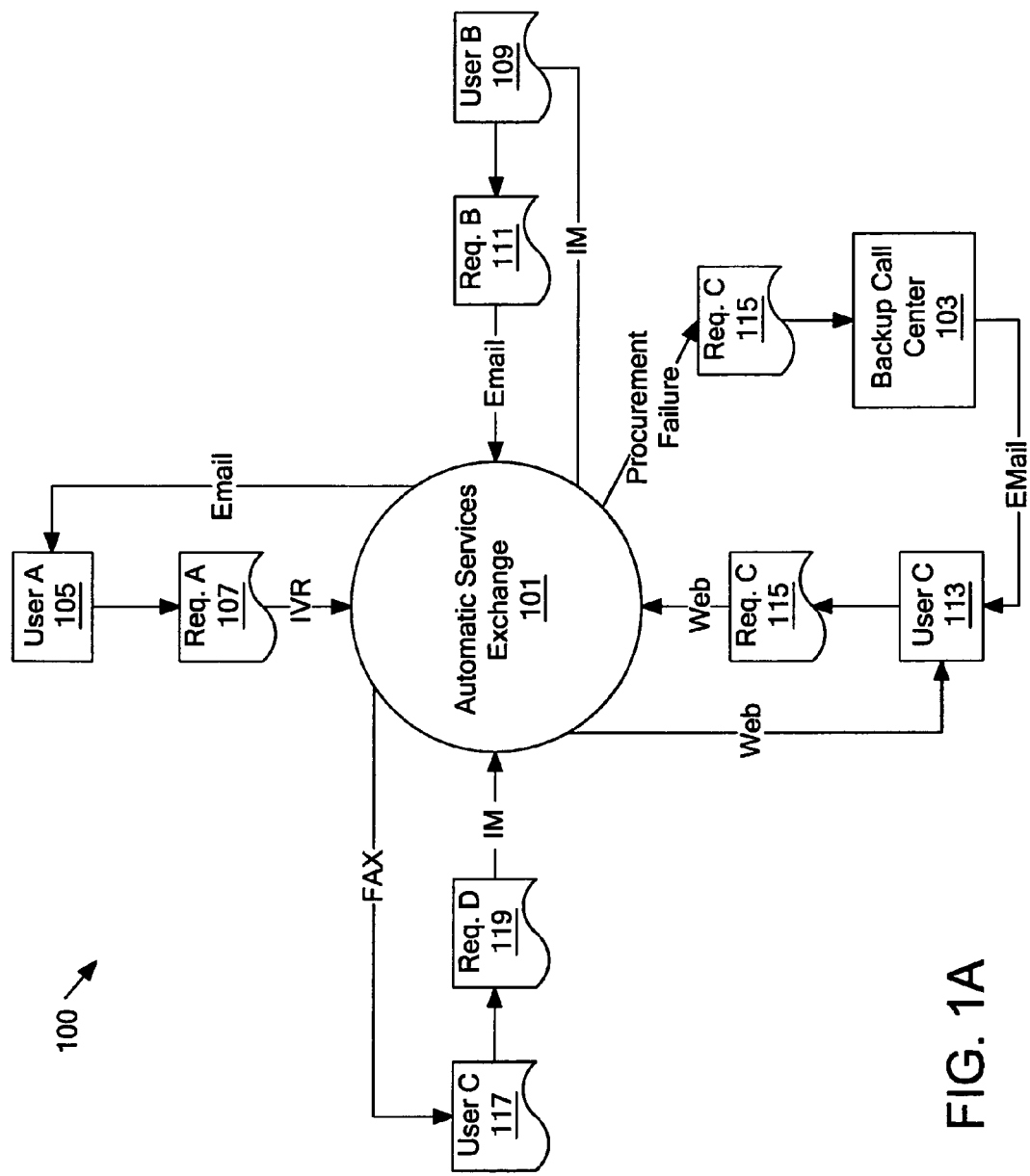
FIGS. 1A-C are diagrams illustrating a system-level overview of an embodiment of an automated services exchange.

A system level overview of the operation of one embodiment of an automatic services exchange system 100 is described by reference to FIGS. 1A-C. In FIG. 1A, the automatic services exchange system 100 is illustrated as having an automatic services exchange component 101 and an optional call center backup component 103. The automatic services exchange component 101 allows users such as a user A 105, user B 109, user C 113, and user D 117 to request services from the exchange. The service requests may be sent to the exchange component 101 through various communication media. For example, user A 105 sends its request A 107 to the exchange component 101 through an interactive voice response system (IVR), user B 109 sends its request B 111 to the exchange component 101 through e-mail (typically a structured e-mail), user C 113 sends its request C 115 via a Web browser, such as Internet Explorer or Netscape or a micro-browser on a WAP enabled cellular telephone, and user D 117 send its request D 119 through an instant messaging system (IM). These different communication media typically have different data formats, such as structured e-mail, or an Internet based markup language such as XML, or IVR voice recognition. Regardless of the communication media used to send the request to the exchange component 101, a response to a request may be sent back to the user through a different media. Thus, FIG. 1A illustrates that user A 105 receives its response through e-mail, user B 109 receives its response via instant messaging, and user D 117 receives its response via fax. In the case of user C 113, the same communication medium, Web, used to send the request is also used to send the response.

The services available through the exchange component 101 include travel services, entertainment service, personal services (e.g., haircutting), educational services, business administrative services and the like. Some services may be time critical, e.g., a dinner reservation at a particular time. The service request specifies other required criteria for the service, such as location (e.g., a certain geographic area), type, duration, quantity, price information (e.g., preferred price or price range and maximum price), etc. Additionally, a single service request may actually require services from multiple different service providers which are linked or associated. For example, if a user is planning a business trip, the request will often require services from airlines, hotels and car rental agencies and perhaps other services which are linked to or associated with the business trip.

The automatic services exchange component 101 automatically sends the service request to various service providers. In one embodiment, this transmission may be through several different electronic communication media such as structured e-mail, XML, IVR, etc. In the event that the exchange component 101 is unable to automatically procure the service requested by the user, the request is transferred to the backup call center component 103. For example, assume that request C 115 from user C 113 could not be automatically fulfilled by the exchange component 101. As illustrated in FIG. 1A, the request C 115 is sent to the backup call center 103 along with other information such as which service providers have already been contacted for the service. One of the human agents or operators at the backup call center 103 attempts to find a service provider for the request. Once the backup call center 103 determines that the request can or cannot be satisfied, it communicates the result to the corresponding user who made the request. In the example, the result is sent to user C 113 through e-mail.

Figure 1B:
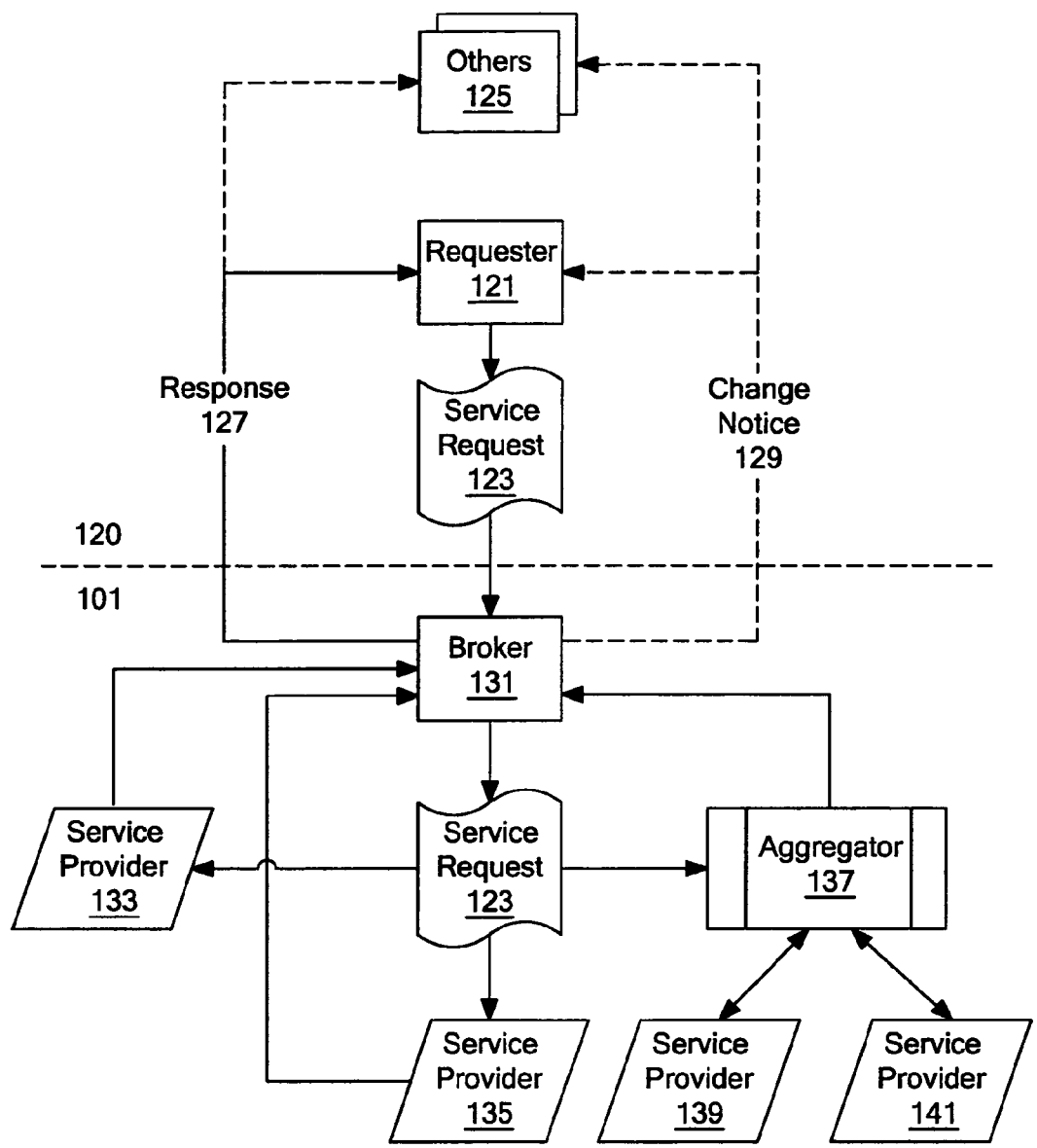
Figure 1C:
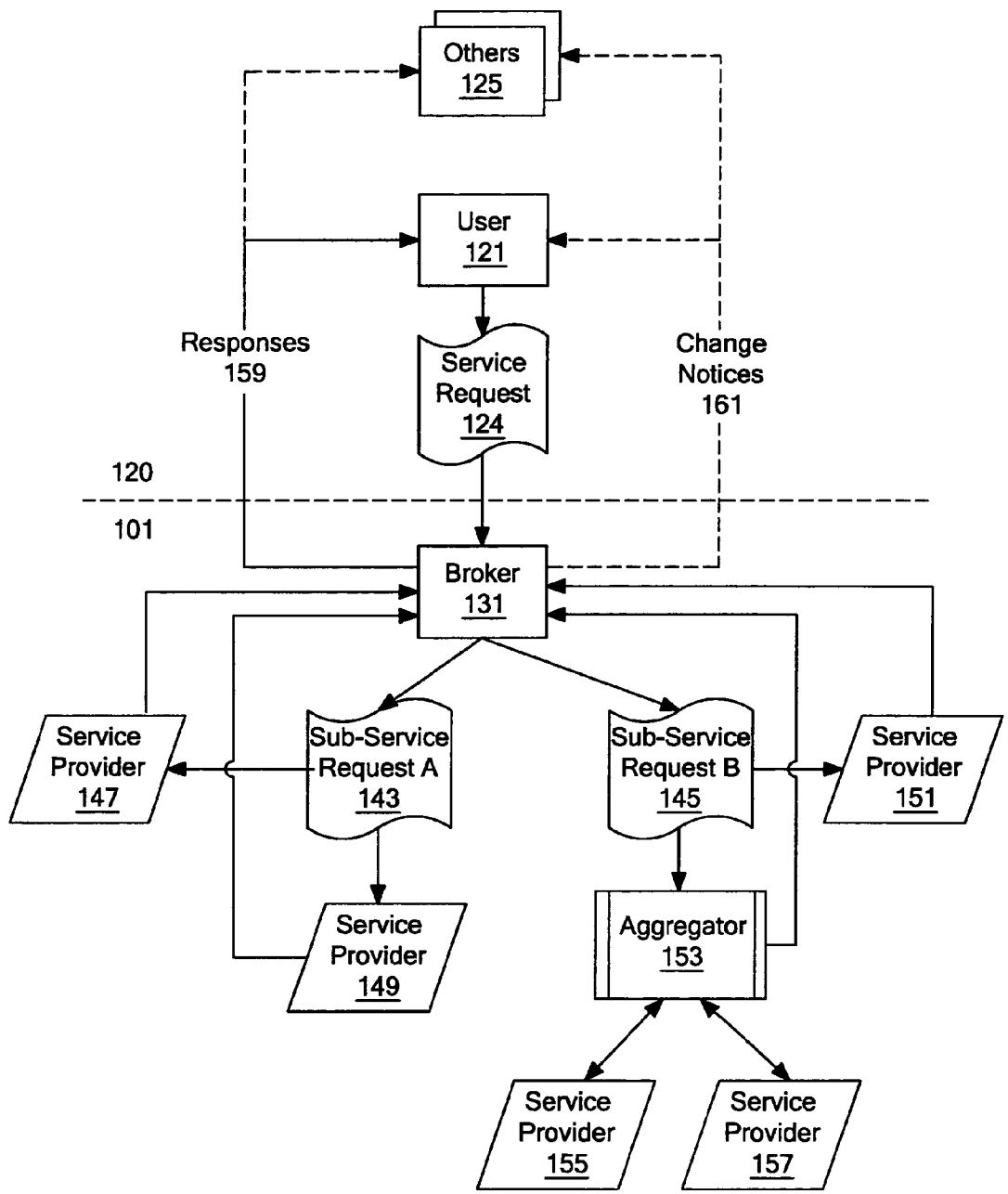

FIGS. 1B and 1C show the operation of the automatic services exchange component 101 in more detail. In FIG. 1B, a requestor 121 sends a service request 123 to the automatic services exchange 101. A broker function 131 receives a service request and passes it onto various service providers, such as service provider 133 and service provider 135. The service request may also be sent to an aggregator that represents multiple service providers, such as aggregator 137 that handles requests for service provider 139 and service provider 141, instead of directly to the service providers. In one embodiment, the service request is sent using an automatic system, such as an IVR system, that asks for a positive or negative reply to the request (e.g., a voice over the telephone says "press 1 if you have a table for two at 6:30 p.m. at your restaurant on XYZ date, press 2 if you do not"). Each of the service providers 133, 135 and the aggregator 137 replies to the broker 131 indicating whether they are able to provide the requested service. The responses to broker 131 may be through different communication media such as the Internet (e.g., via an XML page), structured e-mail, or IVR.

Assuming there is at least one positive reply, the broker 131 sends a response 127 to the requestor 121 with the results indicating at least one response matched the request. Depending on parameters set by the requestor 121, if multiple positive replies are received by the broker 131, the broker may choose the best match based on the required or predetermined criteria or it may send responses for all the positive replies to the requestor 121 for selection. The requestor 121 may also authorize the broker 131 to contract for the service under certain circumstances without waiting for approval from the requestor 121. A match to request typically means that the response from the service provider is within the range of acceptable requesting parameters such as time of service, location of service, price of service, level (e.g., quality requested) of service, and other parameters specified by the request.

As illustrated in phantom in FIG. 1B, the broker 131 may also send the response 127 to others 125 specified by the requestor 121. For example, when multiple people are planning a dinner, one person, the requester 121, may be in charge of obtaining the reservation, but the other people involved should receive notification of the particulars.

Also shown in phantom in FIG. 1B, is the capability of sending a change notice 129 to the requestor 121 if a procured service changes before its performance date. This change may occur by a modified request which is issued by the requestor 121. Similarly, the change notice 129 may also be sent to others 125 specified by the requestor 121. The requester can approve the change if the change is satisfactory, or submit a new service request if the change is unsatisfactory, or if the service is now unavailable from the original provider (not shown). The exchange system of the invention, in one embodiment, can automatically respond to a modified request.

The broker 131 reviews, through an automatic machine implemented process, the service requests to determine if the service request is actually a request for multiple services, such as multiple services which are linked or associated such as those associated with an event (e.g., a business trip which requires airline tickets, rental car reservation and hotel reservation). The resulting operation is illustrated in FIG. 1C. The broker 131 breaks such a request into sub-service requests 143 and 145 and sends each to the appropriate service providers. Thus, in FIG. 1C, sub-service request A 143 is sent to service providers 147, 149, while sub-service request B 145 is sent to service provider 151 and aggregator 153, which aggregates the services from service providers 155 and 157. As before, each service provider/aggregator typically returns a message to the broker 131 specifying its ability to provide the service. Each sub-service response 159 may be sent separately to the requestor 121 or the broker 131 may wait until all service providers/aggregators have responded or until a match to each sub-service request has been found. As in FIG. 1C, change notices 161 also will be sent to the user 121 upon a change in a procured service. Additionally, the responses 159 and the change notices 161 may be sent to others 125 specified by the requestor 121.

The particular methods of the invention are now described in terms of computer software with reference to a series of flowcharts. The methods to be performed by a computer constitute computer programs made up of computer-executable instructions illustrated as blocks (acts). Describing the methods by reference to a flowchart enables one skilled in the art to develop such programs including such instructions to carry out the methods on suitably configured computers (e.g., the processor of the computer executing the instructions from computer-readable media). The computer-executable instructions may be written in a computer programming language or may be embodied in firmware logic. If written in a programming language conforming to a recognized standard, such instructions can be executed on a variety of hardware platforms and for interface to a variety of operating systems. In addition, the present invention is not described with reference to any particular programming language. It will be appreciated that a variety of programming languages may be used to implement the teachings of the invention as described herein. Furthermore, it is common in the art to speak of software, in one form or another (e.g., program, procedure, process, application, module, logic . . . ), as taking an action or causing a result. Such expressions are merely a shorthand way of saying that execution of the software by a computer causes the processor of the computer to perform an action or a produce a result.

Figure 2A:
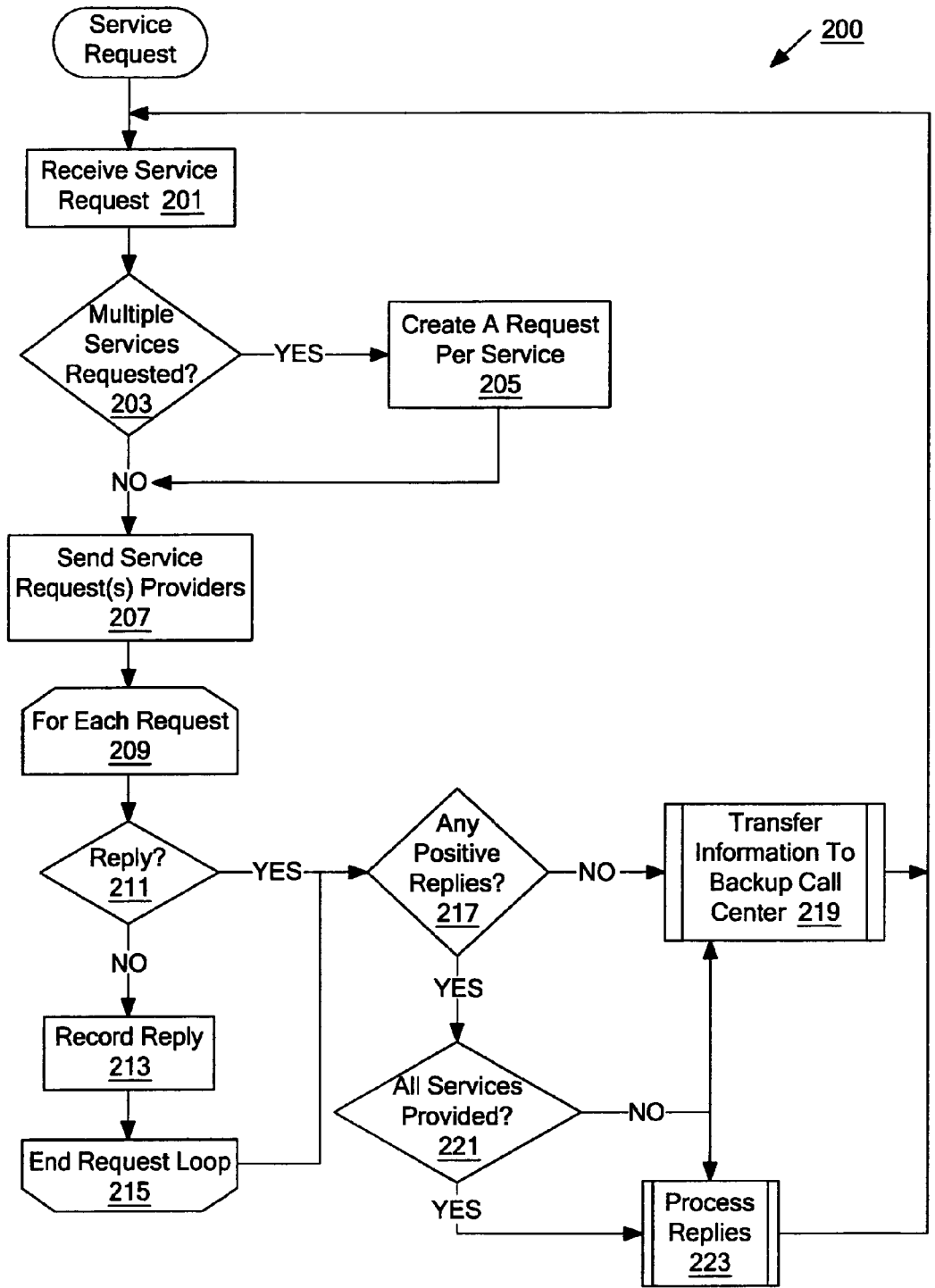
FIGS. 2A-C are flowcharts of methods to be performed typically by computers in executing an embodiment of a automated services exchange illustrated in FIGS. 1A-C.
Figure 2B:
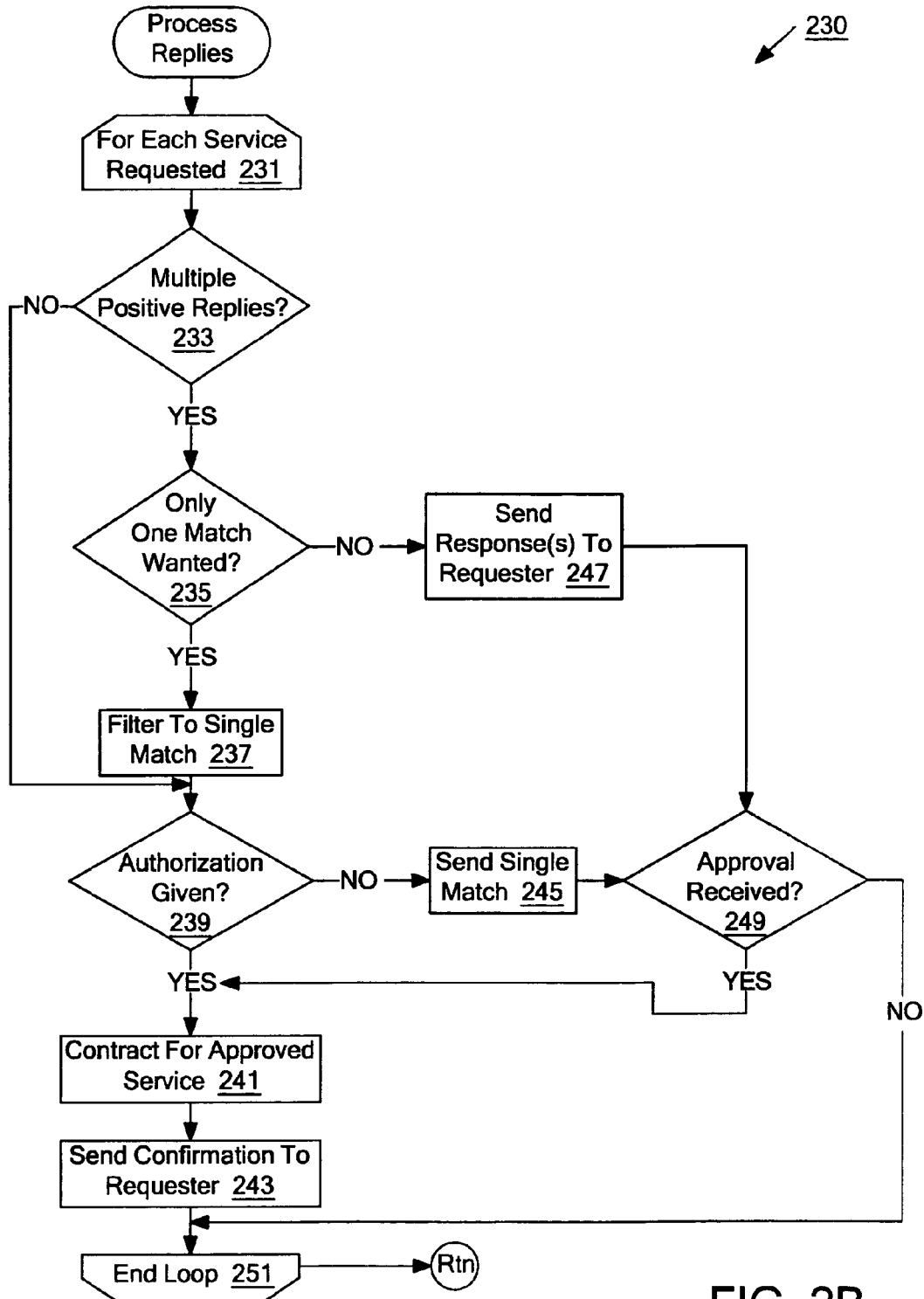
Figure 2C:
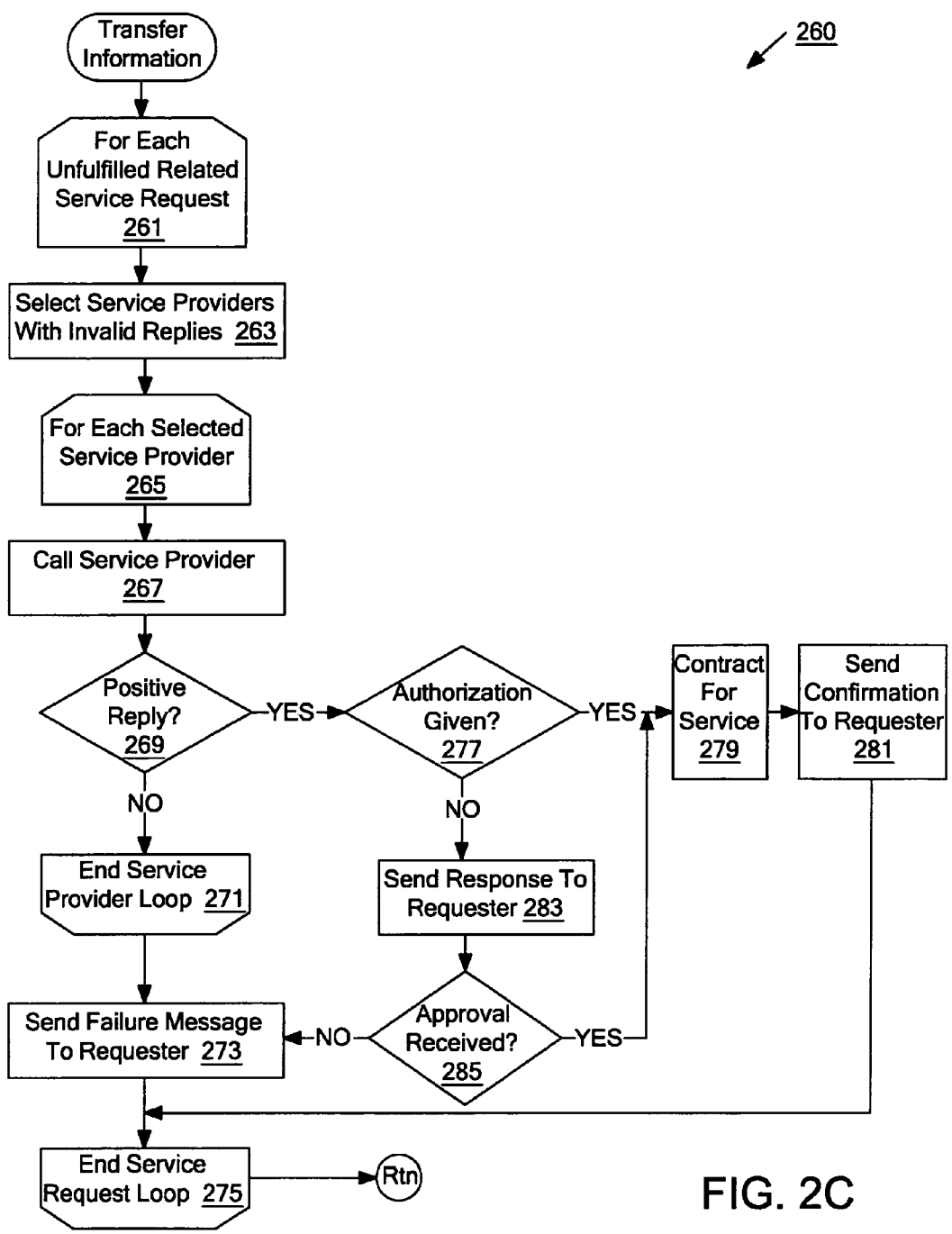
Figure 3:
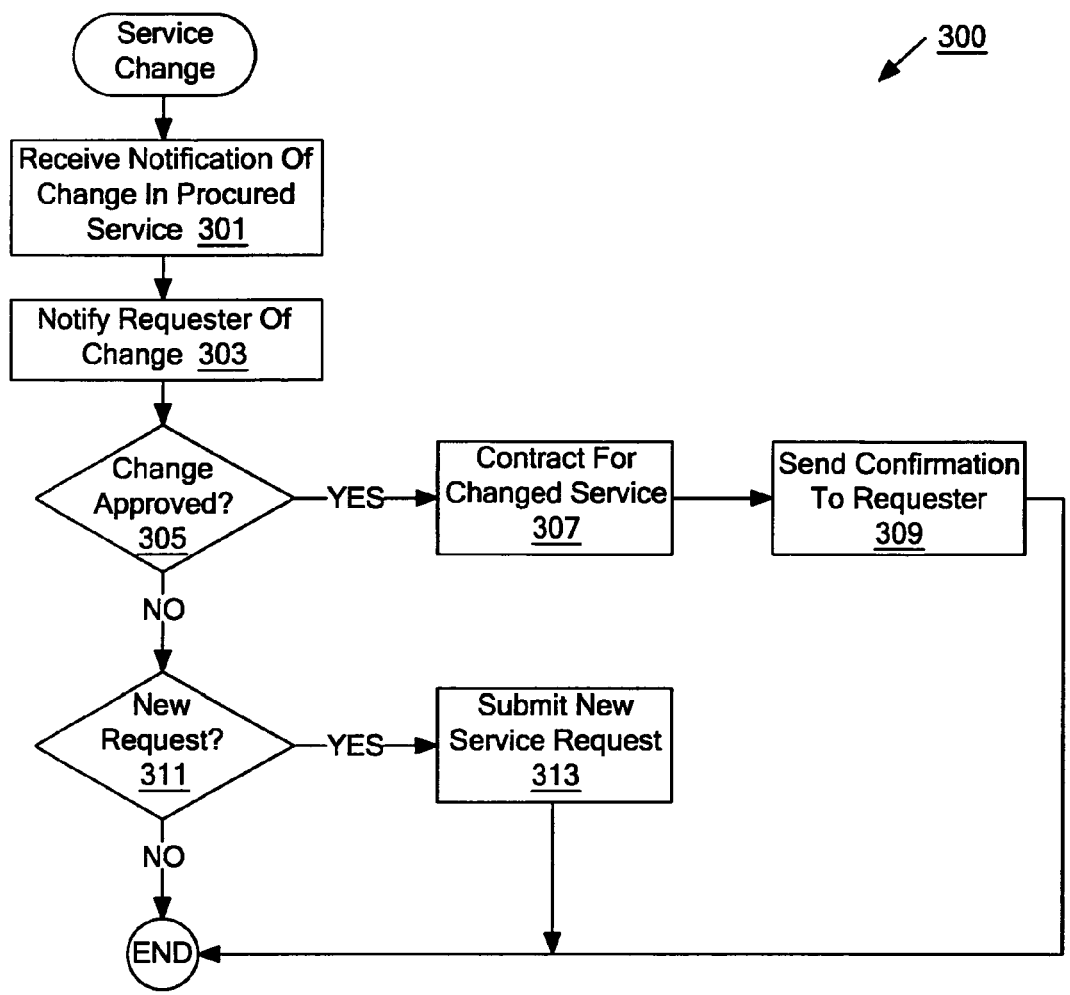
FIG. 3 is a flowchart of an optional method to be performed by a computer in executing an embodiment of the automated services exchange illustrated in FIGS. 1A-C.

FIGS. 2A and 2B illustrate the acts to be performed by a computer, or set of computers, acting as the automatic services exchange component 101 of FIG. 1A in processing service requests. FIG. 2C illustrates the acts to be performed by a computer acting in conjunction with the backup call center 103 in FIG. 1A. FIG. 3 illustrates the acts to be performed by the computer acting as the automatic services exchange component when the optional change notification is desired.

Referring first to FIG. 2A, a service request method 200 receives a service request method (block 201) and examines it to determine if there are multiple, related services requested (block 203). If so, the service request method 200 creates a request for each service (block 205). Once the multiple requests are created, or if there is only one request, the service requests are sent to the appropriate providers (including aggregators) for the services (block 207).

The service request method 200 processes the replies for each request separately as illustrated by request loop starting at block 209. It will be appreciated that multiple request loops may be running concurrently. The requestor may specify a time which is associated with a deadline for completion of a search for a match to a request. In one embodiment, the requestor specifies a predetermined required period of time (time out period or deadline) within which replies must be received or by which time the requestor should be contacted by the exchange to inform the requestor of the incomplete status of a request. In another embodiment, the time out period is determined by the method 200 based on time criteria specified in the request. The request loop waits at block 209 until an incoming reply is received or until the time out period expires. When the request loop is activated by an incoming reply (block 211), the reply is recorded at block 213. If all replies have not yet been received, the request loop returns to its wait state. If all replies have been received, the particular request loop ends (block 215) and the method 200 proceeds to block 217 to evaluate the replies. Alternatively, if the time out period expires before any or all replies are received, the method 200 also proceeds to block 217. The time out period can provide the exchange system with some time to attempt to "manually" (through the intervention of a human operator) procure the service with enough time before the service is actually required. If the user/requestor fails to specify a time out period, the exchange system may specify a default time out period which is at least several hours before the requested time of the service (e.g., a 4:30 p.m. time out for a dinner reservation at 7:30 p.m.) or at least one day before the requested date of the service. Further, this time out period also allows the requestor to be notified of a failure to procure a service before the time requested for the service so that the requestor can take appropriate actions.

At block 217, the method 200 determines if any positive replies were received. If not, the corresponding request is transferred to the backup call center (which includes human operators) for processing along with all replies (block 219) so the backup call center knows the current status of the request (e.g., who has replied to the request, who has not, etc.). The processing represented by block 219 is described in more detail in conjunction with FIG. 2C further below.

If multiple services were requested, the method 200 determines if at least one service provider has replied positively to each service request (block 221). Requests that cannot been procured are sent to the backup call center at block 219, while positive replies are processed at block 223 (e.g., by sending out confirmations to the requestor and the service providers to secure the providing of the service). Similarly, if only one service was requested and at least one reply is positive, the method 200 proceeds to block 223 to process the reply. The processing represented by block 223 is described next.

One embodiment of a process reply method 230 is illustrated in FIG. 2B. It will be appreciated that multiple instances of the method 230 may be executing simultaneously based on the number of service requests that were made. For each service requested (block 231), the process reply method 230 determines if multiple positive replies for a service were received (block 233). If so, but only one match has been requested (block 235), the method 230 filters the replies to find a single match that best satisfies the criteria specified by the requestor (or specified as defaults by the system of the exchange service) (block 237). If there was only one positive reply for the service, or once a single reply has been filtered out in block 237, the method 230 determines if the requestor has authorized the automatic services exchange system to automatically procure the service (block 239). If so, the method 230 contracts or otherwise reserves the service from the corresponding service provider (block 241) and sends a confirmation request confirmation to the requestor that the service has been procured (block 243). In these situations where the service provider requires a commitment (e.g., a down payment or a deposit) from the requestor, the automatic services exchange provides payment information (e.g., credit card name, number and expiration date) previously provided by the requestor to the automatic services exchange or requests that this information be provided by the requestor to either the exchange (so it can be forwarded to the service provider) or to the service provider directly. If, however, there is no authorization (block 239), the information in the reply is sent to the requestor at block 245 and the method 230 waits to receive approval from the requestor. If approval is received (block 249), the method 230 contracts for or otherwise reserves the approved service and sends a confirmation as previously described. However, if approval of the particular service is not received from the requestor, the service request is terminated.

If more than one match is wanted at block 235 (as specified by a predetermined preference sent by the requestor or as set as a default by a system of the exchange service), a response containing all positive replies is sent to the requestor for selection (block 247) and the method 230 waits to receive approval of one of the providers at block 249. As in the case of a single reply, the method 230 contracts for or otherwise reserves the service from the approved provider at block 241 and returns a confirmation message at block 243, or the request is terminated if no approval is received.

Turning now to FIG. 2C, one embodiment of an information transfer method 260 for a backup call center is illustrated. When the service request is sent to the providers through an automatic system, a reply may be invalid such as when a person, in response to questions from an IVR system, presses an incorrect digit on a telephone key pad or hangs up without replying or if the call is unanswered. For each unfulfilled related service request (block 261), the method 260 selects those service providers that gave invalid replies (block 263). Each of the selected service providers (block 265) will be called by a human agent (block 267) until one provider is able to provide the service (block 269) or until all have been called (block 271). If no service provider can fulfill the service request, the method 260 sends a failure message to the requester at block 273. If there are no further related service requests (block 251), the method 260 terminates.

The first positive reply at block 269 causes the method 260 to determine if the requester has authorized the automatic services exchange system to automatically procure the service (block 277). If so, the method 260 contracts or otherwise reserves the service from the corresponding service provider (block 279) and sends a confirmation request confirmation to the requestor that the service has been procured (block 281). If, however, there is no authorization at block 277, the information in the reply is sent to the requestor (block 283) and the method 260 waits to receive approval from the requestor. If approval is received (block 285), the method 260 contracts for or otherwise reserves the approved service and sends a confirmation as previously described. However, if approval of the particular service is not received from the requestor, a failure message is sent to the requester at block 272.

As described previously, the automatic services exchange system optionally can send change notices to the requester to alert him/her of changes in a procured service or receive a modified request from the requestor even after the services have been procured. One embodiment of a service change method 300 that communicates changes is illustrated in FIG. 3. When the method 300 receives notification of a change in a procured service (block 301), it notifies the requester and asks if the requester approves the change or wishes to submit a new service request (block 303). If the change is approved (block 305), a message is sent to the service provider to contract for the changed service (block 307) and the change is confirmed to the requester (block 309). If the change is not approved but a new service request is submitted (block 311), the new request is resubmitted into the automatic services exchange system at block 313.

The particular methods performed by computers acting as the automatic services exchange and backup call center components for one embodiment of the invention have been described with reference to flowcharts in FIGS. 2A-C and 3, including all the acts from 201 until 223, from 231 until 251, from 261 until 285, and 301 until 313, respectively. It will be appreciated that more or fewer processes may be incorporated into the methods illustrated in FIGS. 2A-C and 3 without departing from the scope of the invention and that no particular order is implied by the arrangement of blocks shown and described herein and that alternative orders of the operations are within the scope of the invention.

Figure 4A:
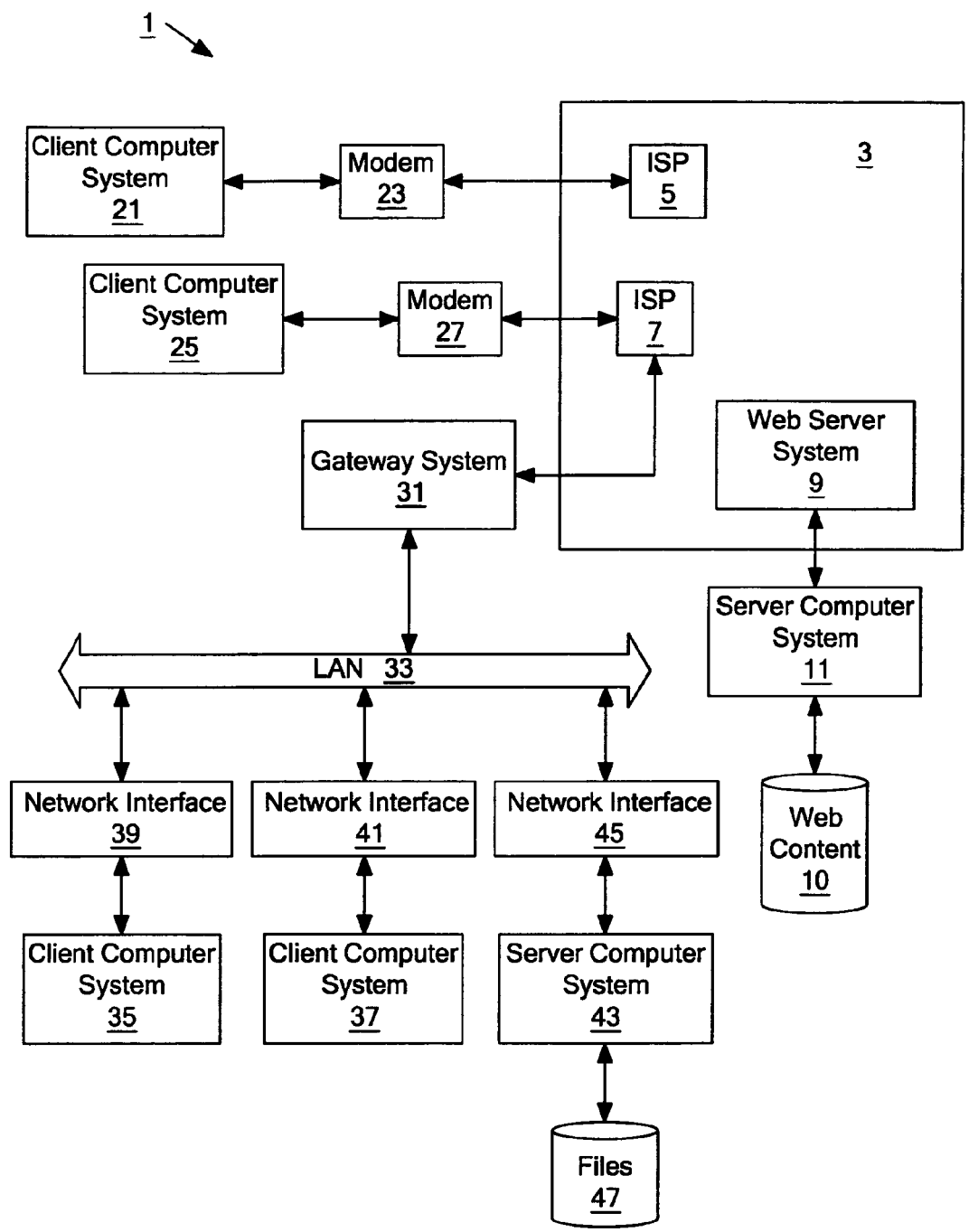
FIG. 4A is a diagram of one embodiment of an operating environment suitable for practicing one embodiment of automated services exchange.
Figure 4B:
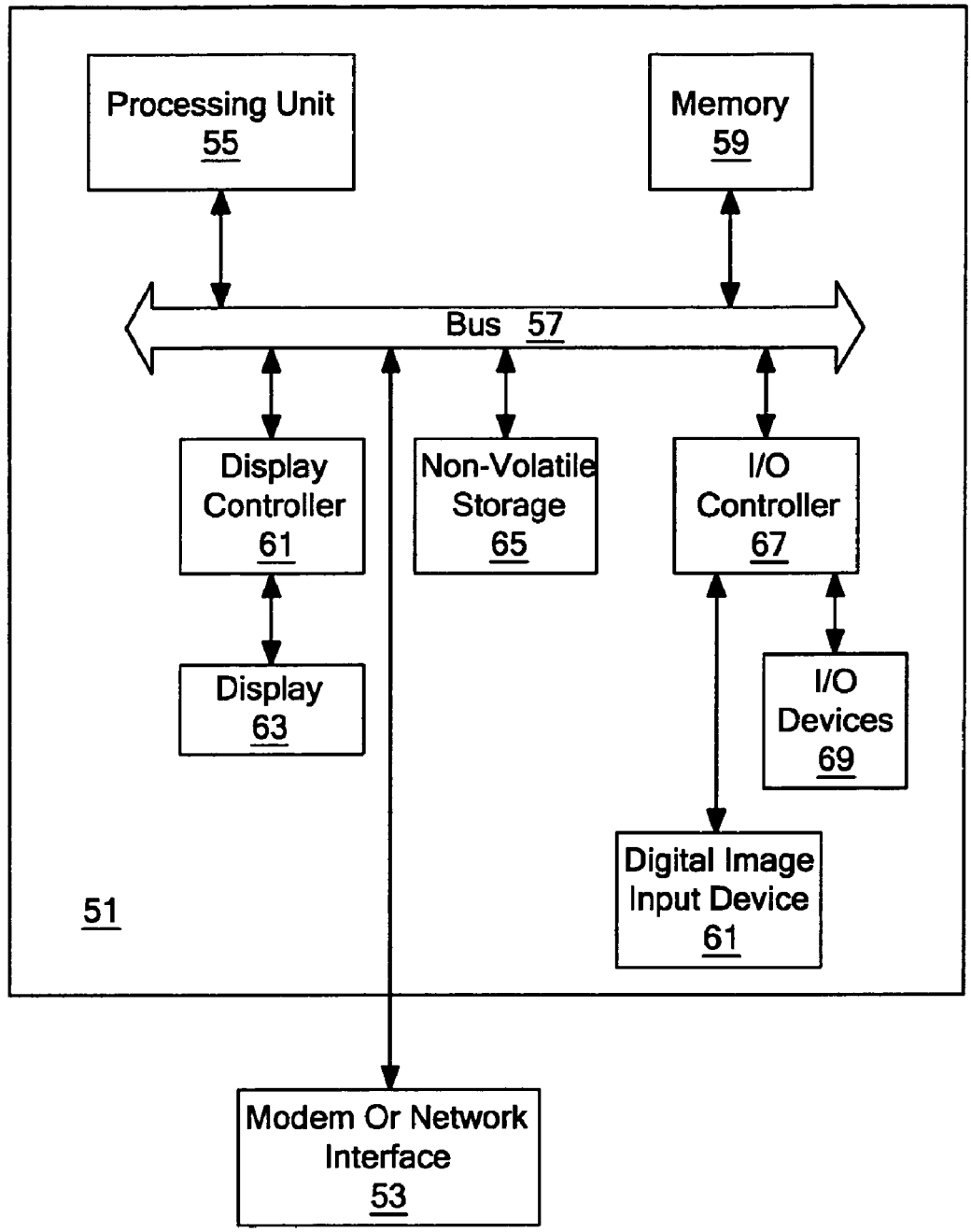
FIG. 4B is a diagram of one embodiment of a computer system suitable for use in the operating environment of FIG. 4A.

The following description of FIGS. 4A-B is intended to provide an overview of computer hardware and other operating components suitable for performing the methods of the invention described above, but is not intended to limit the applicable environments. One of skill in the art will immediately appreciate that the invention can be practiced with other computer system configurations, including hand-held devices (e.g., PDAs—personal digital assistants such as a Palm Pilot; or cell phones, etc.), multiprocessor systems, microprocessor-based or programmable consumer electronics, network PCs, minicomputers, mainframe computers, and the like. The invention can also be practiced in distributed computing environments where tasks are performed by remote processing devices that are linked through a communications network having a physical or wireless infrastructure, or a combination of both.

FIG. 4A shows several computer systems that are coupled together through a network 3, such as the Internet. The term "Internet" as used herein refers to a network of networks which uses certain protocols, such as the TCP/IP protocol, and possibly other protocols such as the hypertext transfer protocol (HTTP) for hypertext markup language (HTML) documents that make up the World Wide Web (web). The physical connections of the Internet and the protocols and communication procedures of the Internet are well known to those of skill in the art. Access to the Internet 3 is typically provided by Internet service providers (ISP), such as the ISPs 5 and 7, through either physical or wireless interfaces. Users on client systems, such as client computer systems 21, 25, 35, and 37 obtain access to the Internet through the Internet service providers, such as ISPs 5 and 7. Access to the Internet allows users of the client computer systems to exchange information, receive and send e-mails, and view documents, such as documents which have been prepared in the HTML format. These documents are often provided by web servers, such as web server 9 which is considered to be "on" the Internet. Often these web servers are provided by the ISPs, such as ISP 5, although a computer system can be set up and connected to the Internet without that system being also an ISP as is well known in the art.

The web server 9 is typically at least one computer system which operates as a server computer system and is configured to operate with the protocols of the World Wide Web and is coupled to the Internet. Optionally, the web server 9 can be part of an ISP which provides access to the Internet for client systems. The web server 9 is shown coupled to the server computer system 11 which itself is coupled to web content 10, which can be considered a form of a media database. It will be appreciated that while two computer systems 9 and 11 are shown in FIG. 4A, the web server system 9 and the server computer system 11 can be one computer system having different software components providing the web server functionality and the server functionality provided by the server computer system 11 which will be described further below.

Client computer systems 21, 25, 35, and 37 can each, with the appropriate web browsing software, view HTML pages provided by the web server 9. The ISP 5 provides Internet connectivity to the client computer system 21 through the modem interface 23 which can be considered part of the client computer system 21. The client computer system can be a personal computer system, a network computer, a Web TV system, a handheld wireless device, or other such computer system. Similarly, the ISP 7 provides Internet connectivity for client systems 25, 35, and 37, although as shown in FIG. 4A, the connections are not the same for these three computer systems. Client computer system 25 is coupled through a modem interface 27 while client computer systems 35 and 37 are part of a LAN. While FIG. 4A shows the interfaces 23 and 27 as generically as a "modem," it will be appreciated that each of these interfaces can be an analog modem, ISDN modem, cable modem, satellite transmission interface (e.g., "Direct PC"), radio frequency (RF), cellular, or other interfaces for coupling a computer system to other computer systems. Client computer systems 35 and 37 are coupled to a LAN 33 through network interfaces 39 and 41, which can be Ethernet network or other network interfaces. The LAN 33 is also coupled to a gateway computer system 31 which can provide firewall and other Internet related services for the local area network. This gateway computer system 31 is coupled to the ISP 7 to provide Internet connectivity to the client computer systems 35 and 37. The gateway computer system 31 can be a conventional server computer system. Also, the web server system 9 can be a conventional server computer system.

Alternatively, as well-known, a server computer system 43 can be directly coupled to the LAN 33 through a network interface 45 to provide files 47 and other services to the clients 35, 37, without the need to connect to the Internet through the gateway system 31.

FIG. 4B shows one example of a conventional computer system that can be used as a client computer system or a server computer system or as a web server system. It will also be appreciated that such a computer system can be used to perform many of the functions of an Internet service provider, such as ISP 5. The computer system 51 interfaces to external systems through the modem or network interface 53. It will be appreciated that the modem or network interface 53 can be considered to be part of the computer system 51. This interface 53 can be an analog modem, ISDN modem, cable modem, token ring interface, satellite transmission interface (e.g., "Direct PC"), radio frequency (RF), cellular, or other interfaces for coupling a computer system to other computer systems. The computer system 51 includes a processing unit 55, which can be a conventional microprocessor such as an Intel Pentium microprocessor or Motorola Power PC microprocessor. Memory 59 is coupled to the processor 55 by a bus 57. Memory 59 can be dynamic random access memory (DRAM) and can also include static RAM (SRAM). The bus 57 couples the processor 55 to the memory 59 and also to non-volatile storage 65 and to display controller 61 and to the input/output (I/O) controller 67. The display controller 61 controls in the conventional manner a display on a display device 63 which can be a cathode ray tube (CRT) or liquid crystal display. The input/output devices 69 can include a keyboard, disk drives, printers, a scanner, and other input and output devices, including a mouse or other pointing device. The display controller 61 and the 110 controller 67 can be implemented with conventional well known technology. A digital image input device 61 can be a digital camera which is coupled to an I/O controller 67 in order to allow images from the digital camera to be input into the computer system 51. The non-volatile storage 65 is often a magnetic hard disk, an optical disk, or another form of storage for large amounts of data. Some of this data is often written, by a direct memory access process, into memory 59 during execution of software in the computer system 51. One of skill in the art will immediately recognize that the term "computer-readable medium" includes any type of storage device that is accessible by the processor 55 and also encompasses a carrier wave that encodes a data signal.

It will be appreciated that the computer system 51 is one example of many possible computer systems which have different architectures. For example, personal computers based on an Intel microprocessor often have multiple buses, one of which can be an input/output (I/O) bus for the peripherals and one that directly connects the processor 55 and the memory 59 (often referred to as a memory bus). The buses are connected together through bridge components that perform any necessary translation due to differing bus protocols.

Network computers are another type of computer system that can be used with the present invention.

Network computers do not usually include a hard disk or other mass storage, and the executable programs are loaded from a network connection into the memory 59 for execution by the processor 55. A Web TV system, which is known in the art, is also considered to be a computer system according to the present invention, but it may lack some of the features shown in FIG. 4B, such as certain input or output devices. A typical computer system will usually include at least a processor, memory, and a bus coupling the memory to the processor. Further, mobile devices, such as PDAs, browsing web phones etc. and their respective supporting infrastructure may also be used as clients etc.

It will also be appreciated that the computer system 51 is controlled by operating system software which includes a file management system, such as a disk operating system, which is part of the operating system software. One example of an operating system software with its associated file management system software is the family of operating systems known as Windows® from Microsoft Corporation of Redmond, Wash., and their associated file management systems.

The file management system is typically stored in the non-volatile storage 65 and causes the processor 55 to execute the various acts required by the operating system to input and output data and to store data in memory, including storing files on the non-volatile storage 65.

Coordination for Group Procurement of Services

One embodiment of the present invention permits group members to add additional reservations onto an existing reservation of a group leader, supervisor or any other member of the group in such a manner as to synchronize travel plans and coordinate locations, etc., both in terms of travel time, sharing rides, staying at the same hotel, tee times, and other services one may desire when attending an event. But rather than book all group members at once, individual group members may make plans separately, to accommodate instances in which group members are, for example, traveling from different locations, or are arriving at different times, etc. For example, a sales person may be coming from a different customer site in another city, while the marketing person and the technical person may be coming from the home office.

FIG. 5 shows a screen as it would be seen by such a group member. The data as displayed on the screen may be shared with the group members via an Internet media, or other alternative media. Section 500 is the header bar of the browser window, and section 501 is the application window for a specific set of services—in this case, travel and accommodations for a business meeting at a customer site. Heading section 502 for the event shows that members of the company Talaris are visiting Forrester Research in Waltham, Mass. Group members can see the travel itinerary of the group leader respectively the first person to book travel in section 503. As each member books travel and other services related to the meeting, the system automatically notifies, via the Internet or other media, the other members of the group and asks if they want to book identical travel services or similar travel services (e.g., start in a different location and ultimately end up at a destination together at a specific time). The system automatically would also coordinate sharing of resources such as a rental car or hotel rooms. Further, the system would enforce corporate policies related to the services being procured. For example, the system might require employees to share a rental car, a limo, a shuttle bus etc. if two or more employees are traveling on a similar trip.

Thus in the example embodiment shown in FIG. 5, group members have the options shown in section 510 to choose one of four travel options. It is clear that in other example embodiments, other, similar options, additional options, or fewer options may be offered. Section 511 is an option to book an identical itinerary, which would be suitable for a person starting the trip from the same location at the same time. This option allows group members to travel together. Section 512 allows group members to book separate, identical air and hotel reservations, but has them share a single car rental; section 513 allows members to meet at the airport upon arrival (in this example, at the Boston airport) so a group member flying in from, for example, New York, could meet with members flying in from San Francisco, to share the car into Walton; and section 514 allows for only booking rooms at the same hotel, so group members may come and go separately but stay at the same hotel, allowing them to meet and travel together to the company site conveniently.

The system illustrated in FIG. 5 is just one embodiment of the novel art of this disclosure for automated coordination of services procurement for a group of individuals involved in a common goal or event. In this and other embodiments, one of the individuals (the leader) would define the attributes of the event and specify the other individuals to be involved in the event (the "group"). All of the individuals would be automatically notified, via the Internet or other media, by the system that they are invited to participate in the goal or event, and all individuals would be able to accept or decline membership in the group event or goal, in some cases in accordance with company policies for such participation, expense rules, privacy rules etc. Likewise, all individuals who accept group membership would be able to procure a combination of services required to execute the event. All individuals who accepted the invitation to join the group would be notified of the booking of services by the other members of the group, and each individual in the group would be able to make a services procurement request for the services procured by any other individual or individual(s) in the group. The system is able to coordinate sharing of the services based on its understanding of the mutual requirements of the group, and is also able to adjust the services procured by members of the group to better meet the overall group's objectives. The system is likewise able to adjust the services procured by the members to optimize the use of the services by the group as a whole, or to intelligently cancel services based on changes in requirements input by one or more members of the group. In some cases, corporate policy may allow some participants to exceed their usual settings in context of a group event. In other cases, it may notify additionally their supervisor, procurement group, or human resources, and in yet other cases, it may require a confirmation by e-mail from a supervisor or similar. The type of services that may be procured are not limited to services related to travel, but rather may also include other services related to attending an event, or other activities to participate in while visiting a location.

Yet in some cases, if a member needs to come in late, for example due to a previous meeting, he may not share in some aspects, such as the share car ride for example etc. In other circumstances, if a member needs special facilities, not available at the hotel/car/flight chosen for the group, the member may break out of the group arrangements. This may be on a case by case basis, with approval and or notification of the group leader, his supervisor etc., or may be pre-defined in the member's profile in some cases.

Figure 6:
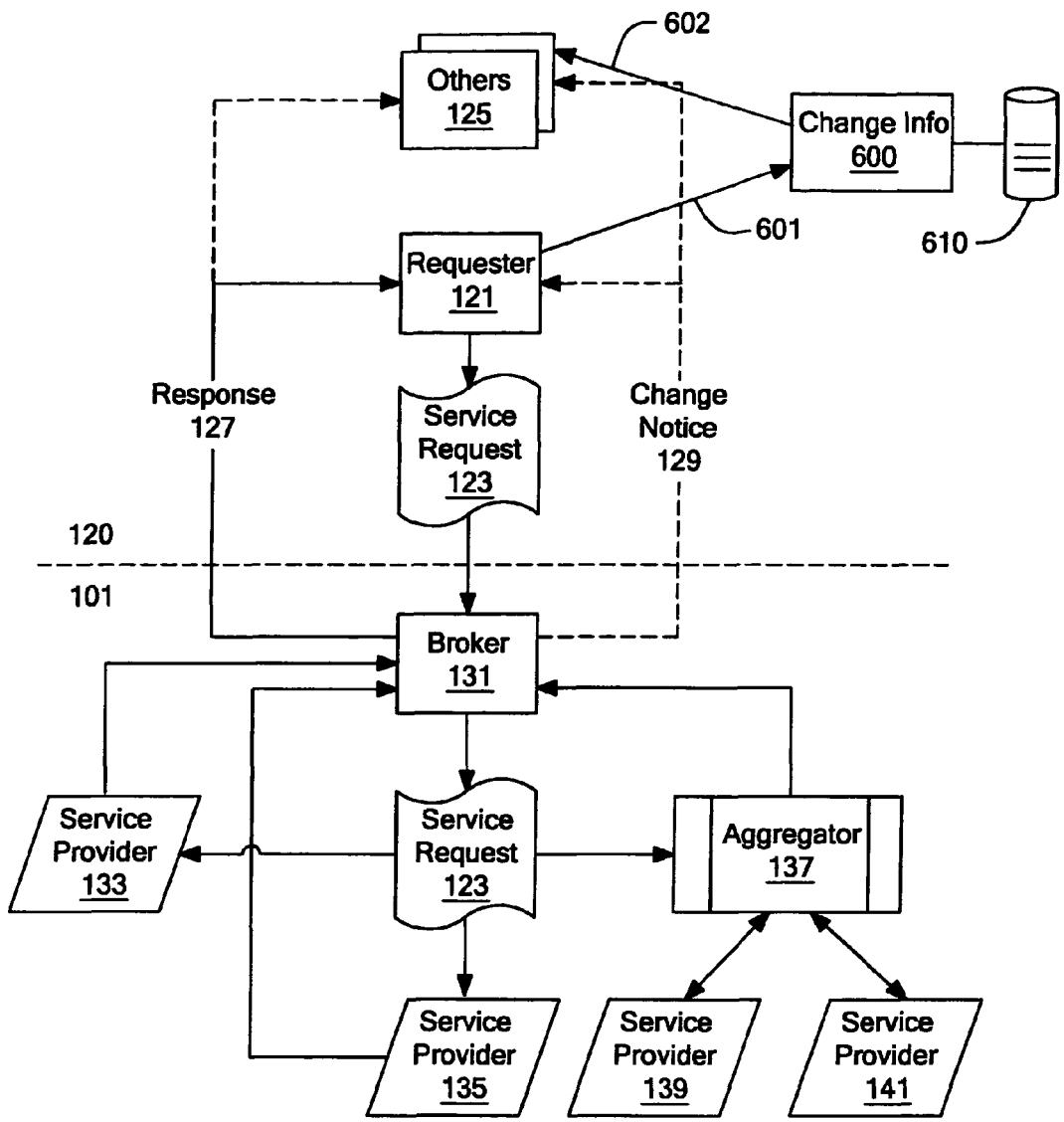
FIG. 6 illustrates block diagram of an alternative embodiment of a automated services exchange.

FIG. 6 illustrates a block diagram of an integration of the embodiment for providing coordination of group procurement of services integrated in the system of FIG. 1b, as discussed above. The integration includes the addition of a group information block 600 that allows the original requester 121 to export his travel plans via function 601 into block 600. The requester can assign group members into a group data base 610, so that when the designated group members log in as other users 125, they can see what travel options are available, pull them down via function 602, and then participate in making travel plans, as described above in relation to FIG. 5. Furthermore, as mentioned above, group member may receive a particular invitation, and in some cases, that may require a supervisor's approval.

In yet other cases, a user may be able to forward their service request in an automatic fashion. For example, a user could initiate a group by inviting others to join for a meeting at a specific date, time, and location. Once they have done this, they have formed a group. Once one member of the group has booked their travel for this particular meeting, they would be prompted to see if they are willing to share their itinerary with the other members of the group. If they give permission for the other members to see the itinerary, all other members of the group would be automatically notified by the system. When notified, the other members of the group would be given options to book similar or identical services. When other group members select an option, a service request such as (123) in FIG. 6 is automatically generated and sent to the services exchange.

Automated Trip Planner

Trips, particularly business trips involving multiple persons, may often be complicated, multi-event expeditions that require a complex orchestration of events and services to meet all the requirements of all parties. Typically, a traveler would like to rely on a personal assistant who, from long experience, knows the preferences of the traveler and therefore can quickly and easily book all the arrangements for services and events of the trip. Even advanced travel service systems, such as Expedia, Travelocity, or airline vacation package services still require the user to specify each element separately. The only convenience offered to the user is that he does not need to seek another provider or re-enter this payment information for each booking. He still has to indicate each desired service separately.

What is clearly needed is a system and method for trip planning that, based on the specifics of the planned event and on a user profile compiled from historical experience and known user preferences, can propose a complete trip package instead of asking the user for responses on each element.

Figure 7:
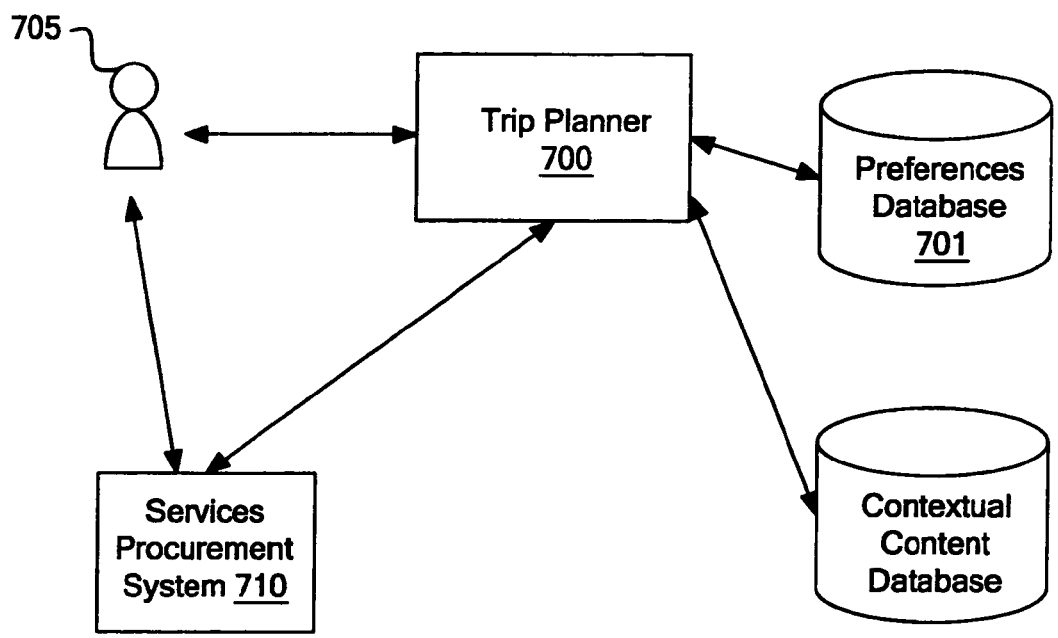
FIG. 7 illustrates one embodiment of a trip planner system.

FIG. 7 shows the one embodiment of a trip planner system 700, which uses preferences database 701 and contextual content database 702. In one embodiment, the system 700 interacts with a services procurement system 710, such as the Talaris services platform, and with user 705. Interaction with the user may be done directly by the trip planner 700 or through the services platform 710.

Further, the system 700 may extract certain location or context-specific information. For example, the system might have a history of typical travel times or patterns for a given city of a traveler. The system might also have data on what options for ground transportation exist at a given airport, such as, for example, shuttle, taxi, subway, and limo. The system would also know how to calculate the cost of the various modes of transportation. Similarly, the system might know how much the hotel charges for parking a car overnight and take that into account when making a recommendation. The contextual information could also include the availability of other services and factor that into decisions on how to plan the trip. For example, the system could know that at a certain airport rental offices (e.g., Laptop Lane) or a Wi-Fi hot spot are available etc. Based on this information, the system might determine that it is better to take certain layovers than others.

Figure 8:
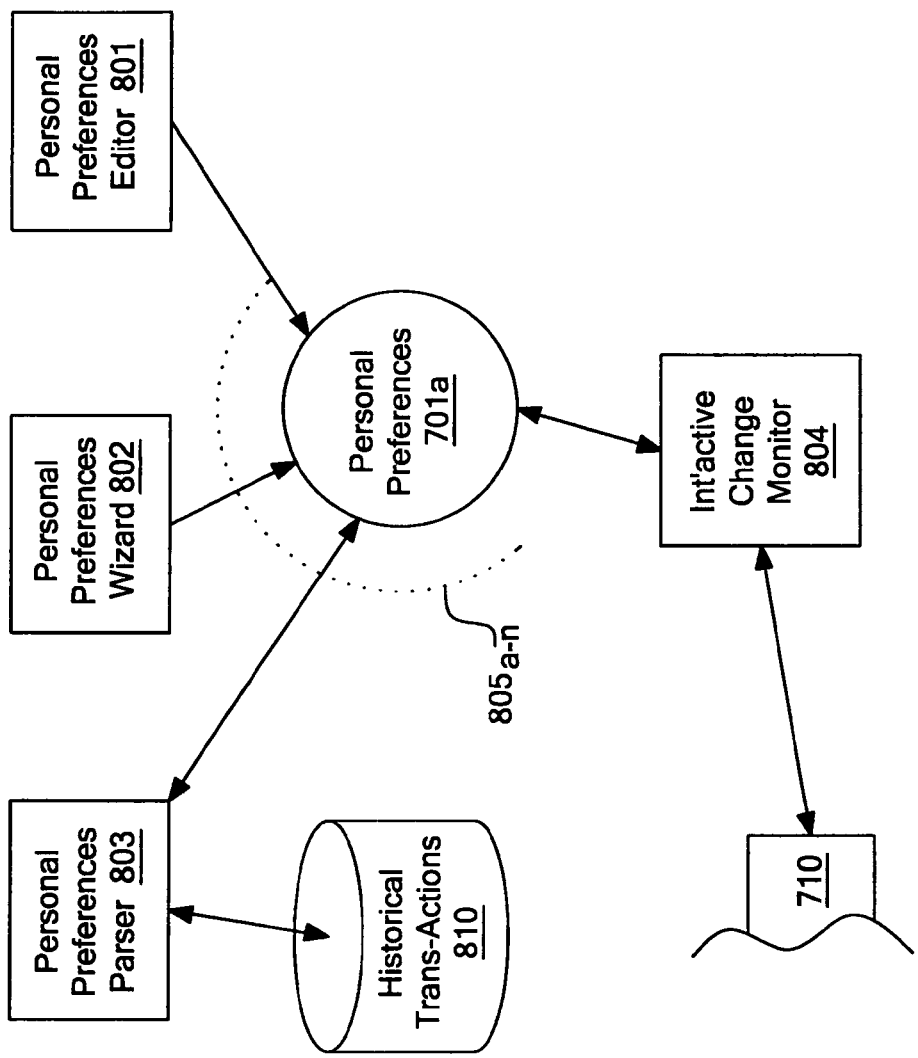
FIG. 8 illustrates one embodiment of a travelers' personal preferences.

FIG. 8 shows, at the center, one embodiment of one traveler's personal preferences set 701a, which is a subset of the preferences in database 701, shown in FIG. 7. FIG. 8 illustrates an alternative way the system may accumulate knowledge of, and interact with, personal preferences set 701 a.

For example, in one embodiment, a personal preference editor 801 allows a user to view and modify records of his preferences. The records could be ordered by type of service (hotel, airline, ground transport, restaurant, etc.), or by location (i.e., when traveling to New York, when traveling to Boston etc.), or by customer/partner to be visited, etc.

In one embodiment, a personal preference wizard 802 could interview the user to initially obtain a comprehensive set of preferences. In one embodiment, a personal preferences parser 803 could, for example, parse a historical transaction databases 810, which can be extracted from system 710, for example a services reservation system.

In one embodiment, an interactive change monitor 804 could track interactive changes occurring during trips as changes are required and the user makes choices. These changes may then be recorded in preferences set 701a. In other cases, they may be culled on a regular basis by refresh reviewing of historic data.

One embodiment of the interactive change monitor 804 may also include the ability to generate automated updates of preferences based on past events or trips. For example, a traveler may consistently stay in a Hilton when visiting a certain city, or ask for certain amenities, etc. In one embodiment, the interactive change monitor 804 extracts these patterns and trends and adjust the preferences and hence the search results (or query) accordingly. As a result the traveler is presented with more targeted results in regards to what they are likely to select as a trip segment.

Figure 9:
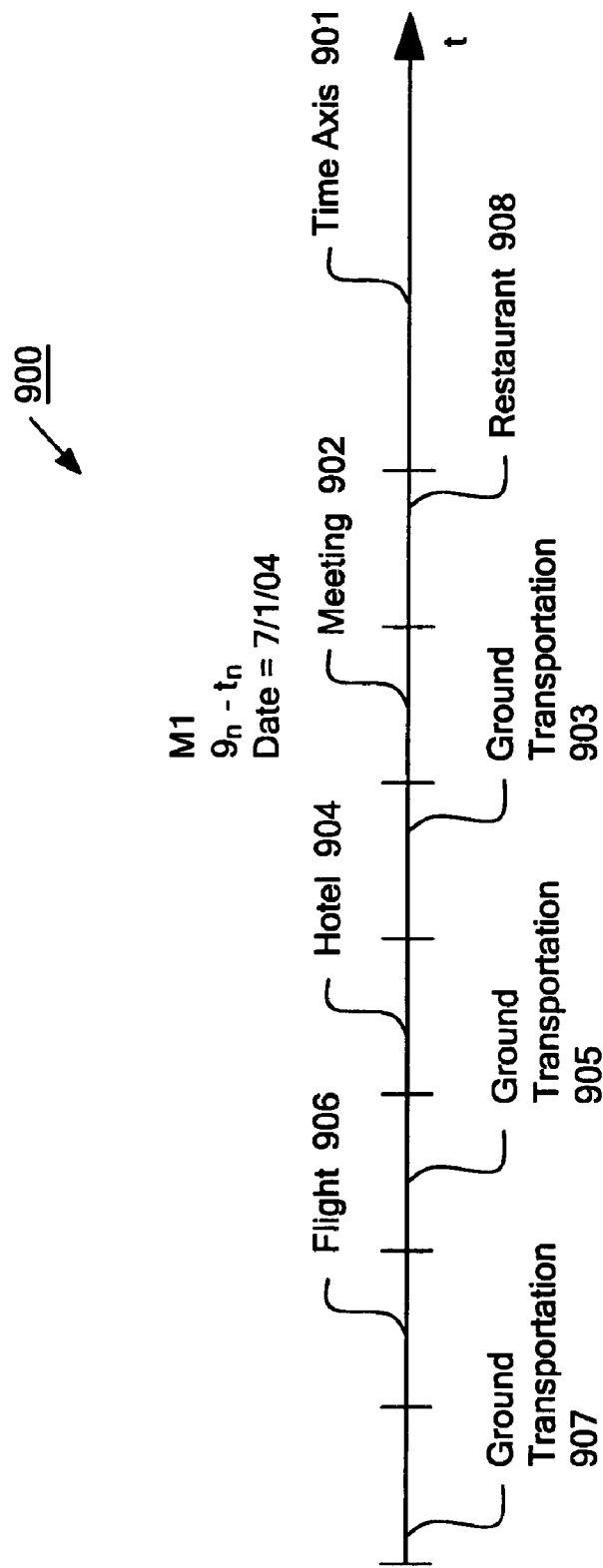
FIG. 9 illustrates an example of building a template for a trip, on time axis, in accordance with one embodiment.

FIG. 9 shows an example of building a template 900 for a trip, on time axis 901. For example, a user may need to plan for a trip to a meeting M1 902. The meeting time is set for 9 a.m. to noon on 1 Jul. 2004. A large set of services and interactions leads up to the meeting, such as ground transportation 907 from home or office to the airport, flight 906 to the meeting, ground transportation 905 from the airport to the hotel, hotel accommodations 904, ground transportation 903 from hotel to meeting. After the meeting may be a restaurant booking 908.

In one embodiment, preferences may be influenced by many factors and may vary according to each situation. Factors may include location, time of day, time of year, customer, country, and many other variables. Based on each factor or combination of factors, event or service preferences may vary.

For example, during the day in New York a traveler may prefer to use the subway, but at night (after 8 p.m.) the traveler may prefer to use a taxi or limo service. When meeting with a certain customer, he may have a particular restaurant preference, or for that specific customer his preference may be to let the customer choose the restaurant. In Los Angeles, the traveler may prefer a rental car, while in New York, he may prefer public transportation (subway by day; limo at night, as stated above). Hotel preferences may also vary, according to each location (city), according to the specific customer visited, or according to some other set or combination of factors.

In addition, in one embodiment the system may issue status updates based on location of a service provider. For example, it may alert a user that a limo is 15 minutes behind schedule based on GPS/driving time estimates and, if necessary, move a flight time based on the resulting schedule change.

In some cases, one embodiment may also be used for services unrelated or not directly related to travel. For example, an invitation to a meeting might first ask invitees if they will attend in person or virtually. If they elect to attend virtually, the system could arrange for audio and web conferencing or possibly video conferencing. Phone available time as discussed above may be scheduled during a trip to a meeting for another meeting. If they elect to attend in person, the system could arrange for travel, as described in the description. Other, additional types of services may also be scheduled through the system.

There are many situational elements that affect preferences, resulting in a complex set of preference rules that may be deduced from the traveler's historical selections and augmented by preference selections input by the traveler. These historical records and stated preferences are used to book a trip according to template 900, in one embodiment.

There may be different templates for a trip involving a single customer visit; a multi-event trip; a multi-city, multi-event trip; etc. Accordingly, one embodiment disclosed herein may automatically suggest templates based on the particulars of the trip, or the user may manually select a specific template type. For example, trips that are automatically planned may have an additional feature or parameter in personal calendar software or web based systems, such as MS Outlook/Exchange™, IBM Lotus Notes™, Yahoo Calendar, or other, similar software that causes the trip planner 700 to transfer the information to the services platform system 710 to be booked accordingly.

Further, in one embodiment trip planner 700 can then block out times for each segment of a trip. In one case, various components of the trip could be entered into a user's calendar with differing definitions of "busy." For example, when a user is in a limo, the calendar might say that they are free for phone calls. Or in another example, the traveler might be available for email on certain flights, based on contextual information about airline email availability and the company's agreement and or rules for use of such facilities, etc.

In one embodiment, the system may offer a search function for previous bookings. For example, a user may search by keyword; such as finding all past trips with "Chicago" and "May" or "Hertz." More generally, this feature may be a mechanism whereby a user can search all previous transactions.

In one embodiment, the system may automatically offer services based on event information. For example, if person's mother dies, it may suggest sending flowers, or if person's calendar says "Meeting in New York," it may suggest a flight.

In one embodiment, automated rules-based changes to services may be included. For example, a terrorist attack in France could cause all flights to France in the next month to be canceled, so the system would send an alert to users. Similarly, automated changes may be based on status updates from service providers. For example, a flight cancellation due to bad weather may cause a travel record to be "protected" so that alternative flights are put in the passenger name record for a user rather than just canceling the whole trip.

Before final bookings are confirmed in one embodiment of the system may send a trip proposal to the user by email, for example, or may send an invitation for the user to review the proposal on a web page.

The processes described above can be stored in a memory of a computer system as a set of instructions to be executed. In addition, the instructions to perform the processes described above could alternatively be stored on other forms of machine-readable media, including magnetic and optical disks. For example, the processes described could be stored on machine-readable media, such as magnetic disks or optical disks, which are accessible via a disk drive (or computer-readable medium drive).

Alternatively, the logic to perform the processes as discussed above could be implemented in additional computer and/or machine readable media, such as discrete hardware components as large-scale integrated circuits (LSI's), application-specific integrated circuits (ASIC's), firmware such as electrically erasable programmable read-only memory (EEPROM's).

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in them selves recite only those features regarded as essential to the invention.

It is clear that many modifications and variations of this embodiment may be made by one skilled in the art without departing from the spirit of the novel art of this disclosure.

The invention claimed is:

1. A method implemented in a computer server, the method comprising:
the computer server automatically scheduling a first travel plan for a traveler using a user profile for the traveler compiled from historical experience and known user preferences of the traveler;
the computer server, in response to the travel plan having been scheduled for the traveler, and without user interaction, automatically searching for one or more persons of interest to the traveler, wherein the searching includes invoking external social network software;
the computer server, in response to one or more identified persons having been identified from the searching, automatically determining if the one or more identified persons is to be present at a location where the traveler is to be present and during a time period the traveler is to be present at the location based on one or more second travel plans relating to the one or more identified persons, wherein if a respective one of the one or more second travel plans is marked as private, the respective travel plan is not used in the determining operation;
the computer server selecting one or more selected persons of the one or more identified persons based on one or more predetermined rules that have been previously given and stored as part of a local contacts database of the computer server;
the computer server, in response to the one or more selected persons being selected, automatically generating one or more alternative travel plans rescheduled based on the first travel plan for the traveler to provide additional time for the traveler to be present at the location with the one or more selected persons;
the computer server automatically confirming a meeting with at least one of the one or more selected persons to meet with the traveler at the location for a period of time when the traveler and at least one of the one or more selected persons are to be present at the location; and
the computer server automatically booking a change to the travel plan to have the traveler be present at the location with the one or more selected persons in response to an electronic meeting confirmation.

2. The method of claim 1, wherein the searching for one or more persons includes searching in at least one internal database of an enterprise associated with the traveler.

3. The method of claim 2, wherein the searching for one or more persons includes accessing external social network software.

4. The method of claim 3, wherein the accessing the external social network software comprises performing an Application Program Interface (API) exchange.

5. The method of claim 2, wherein the searching for one or more persons comprises one of web page harvesting and screen scraping.

6. A non-transitory machine-readable medium having stored thereon a set of instructions—, the instructions causing a computer server to perform a method, the method comprising:
the computer server automatically scheduling a first travel plan for a traveler using a user profile for the traveler compiled from historical experience and known user preferences of the traveler;
the computer server, in response to the travel plan having been scheduled for the traveler, and without user interaction, automatically searching for one or more persons of interest to the traveler, wherein the searching includes invoking external social network software;

the computer server, in response to one or more identified persons having been identified from the searching, automatically determining if the one or more identified persons is to be present at a location where the traveler is to be present and during a time period the traveler is to be present at the location based on one or more second travel plans relating to the one or more identified persons, wherein if a respective one of the one or more second travel plans is marked as private, the respective travel plan is not used in the determining operation;

the computer server selecting one or more selected persons of the one or more identified persons based on one or more predetermined rules that have been previously given and stored as part of a local contacts database of the computer server;

the computer server, in response to the one or more selected persons being selected, automatically generating one or more alternative travel plans rescheduled based on the first travel plan for the traveler to provide additional time for the traveler to be present at the location with the one or more selected persons;

the computer server confirming a meeting with at least one of the one or more selected persons to meet with the traveler at the location for a period of time when the traveler and at least one of the one or more selected persons are to be present at the location; and the computer server automatically booking a change to the travel plan to have the traveler be present at the location with the one or more selected persons in response to an electronic meeting confirmation.

7. The non-transitory machine-readable medium of claim 6, wherein the searching includes searching at least one internal database of an enterprise associated with the traveler.

8. The non-transitory machine-readable medium of claim 6, wherein the invoking the external social network software comprises one of web page harvesting and screen scraping.

9. The non-transitory machine-readable medium of claim 6, wherein the invoking the external social network software comprises performing an Application Program Interface (API) exchange.

10. A computer system comprising:
a computer configured to:
  automatically schedule a first travel plan for a traveler using a user profile for the traveler compiled from historical experience and known user preferences of the traveler;
  automatically search without user interaction for one or more separate persons of interest to the traveler, in response to the travel plan having been scheduled for the traveler, wherein the searching includes invoking external social network software;
  automatically determine if one or more identified persons is to be present at a location where the traveler is to be present and during a time period the traveler is to be present at the location based on one or more second travel plans relating to the one or more identified persons in response to the one or more identified persons having been identified from the searching, wherein if a respective one of the one or more second travel plans is marked as private, the respective travel plan is not used in the determining operation;
  select one or more selected persons of the one or more identified persons based on one or more predetermined rules that have been previously given and stored in a local contacts database of the computer;
  automatically generate one or more alternative travel plans rescheduled based on the first travel plan for the traveler to provide additional time for the traveler to be present at the location with the one or more selected persons, in response to the one or more selected persons being selected;
  confirm a meeting with at least one of the one or more selected persons to meet with the traveler at the location for a period of time when the traveler and at least one of the one or more selected persons are to be present at the location; and
  automatically book a change to the travel plan to have the traveler be present at the location with the one or more selected persons in response to an electronic meeting confirmation.

11. The computer system of claim 10, wherein the computer is further configured to search at least one internal database of an enterprise associated with the traveler to search for the one or more separate persons.

\* \* \* \* \*